United States Patent
Andersson et al.

(10) Patent No.: US 10,358,996 B2
(45) Date of Patent: Jul. 23, 2019

(54) ENGINE CONTROL STRATEGY

(71) Applicant: WALBRO LLC, Tucson, AZ (US)

(72) Inventors: Martin N. Andersson, Caro, MI (US);
Mark S. Swanson, Cass City, MI (US);
Takashi Abei, Sendai (JP); Cyrus M. Healy, Ubly, MI (US)

(73) Assignee: Walbro LLC, Tucson, AZ (US)

( * ) Notice: Subject to any disclaimer, the term of this patent is extended or adjusted under 35 U.S.C. 154(b) by 67 days.

(21) Appl. No.: 15/520,578

(22) PCT Filed: Sep. 30, 2016

(86) PCT No.: PCT/US2016/054623
§ 371 (c)(1),
(2) Date: Apr. 20, 2017

(87) PCT Pub. No.: WO2017/078868
PCT Pub. Date: May 11, 2017

(65) Prior Publication Data
US 2017/0314490 A1 Nov. 2, 2017

Related U.S. Application Data

(63) Continuation-in-part of application No. PCT/US2015/059376, filed on Nov. 6, 2015.
(Continued)

(51) Int. Cl.
*F02P 5/04* (2006.01)
*F02P 5/15* (2006.01)
*F02D 31/00* (2006.01)
(Continued)

(52) U.S. Cl.
CPC ....... *F02D 41/1454* (2013.01); *F02D 31/002* (2013.01); *F02D 31/007* (2013.01);
(Continued)

(58) Field of Classification Search
CPC .... F02D 41/1454; F02D 41/26; F02D 31/007; F02D 31/002; F02D 37/02; F02D 31/008;
(Continued)

(56) References Cited

U.S. PATENT DOCUMENTS 5,709,193 A * 1/1998 Svensson .............. F02D 31/007
123/333
6,272,425 B1 8/2001 Herndon
(Continued)

OTHER PUBLICATIONS

International Search Report and Written Opinion of the International Searching Authority in PCT/US2015/059376 dated Feb. 22, 2016 (14 pages).
(Continued)

*Primary Examiner* — Jacob M Amick
*Assistant Examiner* — Charles Brauch
(74) *Attorney, Agent, or Firm* — Reising Ethington P.C.

(57) ABSTRACT

A method and apparatus controlling the fuel-to-air ratio of a fuel and air mixture supplied to an operating engine includes the steps of determining a first engine speed before enleanment of the mixture, determining a second engine speed near or at the end of a period of enleanment of the mixture, and after ending the enleanment, determining whether the engine speed recovers within a predetermined range of the first engine speed and if so determining a delta speed difference between the first and second speeds and using this delta speed difference as a factor in determining a change in the fuel-to-air ratio of the fuel mixture supplied to the engine.

36 Claims, 13 Drawing Sheets

Related U.S. Application Data

(60) Provisional application No. 62/075,945, filed on Nov. 6, 2014.

(51) Int. Cl.
  *F02D 37/02* (2006.01)
  *F02D 41/14* (2006.01)
  *F02D 41/26* (2006.01)

(52) U.S. Cl.
  CPC ........... *F02D 31/008* (2013.01); *F02D 37/02* (2013.01); *F02D 41/26* (2013.01); *F02P 5/045* (2013.01); *F02P 5/1508* (2013.01); *F02D 2200/101* (2013.01); *Y02T 10/46* (2013.01)

(58) Field of Classification Search
  CPC ... F02D 2200/101; F02P 5/045; F02P 5/1508; Y02T 10/46
  See application file for complete search history.

(56) References Cited

U.S. PATENT DOCUMENTS

| | | |
|---|---|---|
| 6,758,189 B2 | 7/2004 | Uraki et al. |
| 7,000,595 B2 | 2/2006 | Andersson et al. |
| 2005/0098152 A1 | 5/2005 | Surnilla et al. |
| 2012/0253636 A1 | 10/2012 | Jiang et al. |
| 2013/0112170 A1 | 5/2013 | Yamashita et al. |
| 2014/0136074 A1 | 5/2014 | Wang et al. |

OTHER PUBLICATIONS

International Search Report and Written Opinion of the International Searching Authority in PCT/US2016/054623 dated Jan. 17, 2017 (11 pages).

\* cited by examiner

ENGINE CONTROL STRATEGY

REFERENCE TO RELATED APPLICATIONS

This application claims the benefit of PCT International Application Serial Number PCT/US16/54623 filed Sep. 30, 2016 which is a continuation-in-part of PCT International Application Serial Number PCT/US15/59376 filed Nov. 6, 2015 which claims the benefit of U.S. Provisional Patent Application Ser. No. 62/075,945 filed Nov. 6, 2014. The disclosure of each of these applications is incorporated herein by reference in its entirety.

TECHNICAL FIELD

The present disclosure relates generally to an engine control strategy.

BACKGROUND

Combustion engines are provided with a fuel mixture that typically includes liquid fuel and air. The air/fuel ratio of the fuel mixture may be calibrated for a particular engine, but different operating characteristics such as loads, acceleration, deceleration, type of fuel, altitude, condition of filters or other engine components, and differences among engines and other components in a production run may affect engine operation.

SUMMARY

In at least some implementations, a method of controlling a fuel-to-air ratio of a fuel and air mixture supplied to an operating internal combustion engine includes the steps of determining a first engine speed before changing and preferably enleaning the fuel-to-air mixture supplied to an operating engine, enleaning the fuel-to-air ratio, determining a second engine speed near or at the end of the enleanment, after ending the enleanment (returning to the fuel-to-air ratio just before enleanment) determining whether the engine speed recovers within a predetermined range of the first engine speed and if so determining a delta speed difference between the first engine speed and the second engine speed and if the delta speed difference is a positive value enriching the fuel-to-air ratio of the mixture supplied to the engine or if the delta speed difference is a negative value enleaning the fuel-to-air ratio of the mixture supplied to the engine. In some implementations, the first engine speed may be determined for a first number of engine revolutions and the enleaning of the fuel-to-air ratio may occur for a second number of engine revolutions greater than the first number of engine revolutions. In some implementations, a plurality of delta speed differences between the first and second engine speeds may be determined and if more than half of this plurality of the delta speed differences are positive values, enriching the fuel-to-air ratio supplied to the engine or if more than half of this plurality are negative values, enleaning the fuel-to-air ratio of the mixture supplied to the engine.

In at least some implementations, a method of controlling engine idle speed includes:
comparing engine speed to a speed threshold where the speed threshold may include a range of speeds;
if the engine speed is outside of the speed threshold, adjusting the timing of an ignition spark up to a threshold amount of ignition timing adjustment; and
if the engine speed is not within said speed threshold after adjustment up to the threshold amount of ignition timing adjustment then adjusting the air/fuel mixture provided to the engine to bring the engine speed within said speed threshold.

In at least one example, the air/fuel mixture adjustment may be provided in an amount sufficient to reduce the magnitude of a previously made ignition timing adjustment. In at least one example, when the ignition timing adjustment reaches the high side of the threshold amount of ignition timing adjustment the fuel mixture is leaned out to increase the engine speed. The high side of the threshold amount of ignition timing adjustment may be the maximum increase in spark advance within the threshold for ignition timing adjustment. And in at least one example, when the ignition timing adjustment reaches the low side of the threshold amount of ignition timing adjustment the fuel mixture is enriched to decrease the engine speed. The low side of the threshold amount of ignition timing adjustment may be the maximum decrease in spark advance within the threshold for ignition timing adjustment.

In at least some implementations, a method of detecting engine cycles includes:
determining the time for consecutive engine revolutions;
comparing the time of a revolution to a consecutive revolution;
repeating the comparison for a first threshold number of revolutions; and
determining if every other revolution is either faster or slower than the intervening revolutions for a second threshold number of revolutions.

In at least one example, when the second threshold is satisfied an ignition spark is skipped based upon the engine revolution timing.

In at least one example, if the second threshold is not satisfied within the first threshold number of engine revolutions, then an ignition spark is skipped every other engine revolution and then the engine speed is determined. If the determined engine speed indicates that the engine speed has not decreased below a threshold amount, the ignition event skipping may be continued. And in addition to continuing the ignition event skipping, the fuel supply to the engine may be adjusted to correspond to the engine intake cycle. If the determined engine speed indicates that the engine speed has decreased below a threshold amount, the ignition event skipping may be changed to the opposite engine revolutions. After the ignition event skipping is changed, the fuel supply to the engine may be adjusted to correspond to the engine intake cycle.

In at least some implementations, a method of controlling engine acceleration or deceleration, includes:
determining occurrence of an engine acceleration or deceleration;
adjusting ignition timing within preselected threshold limits during acceleration or deceleration of the engine; and
adjusting an air-fuel mixture delivered to the engine during acceleration and deceleration of the engine.

In at least one example, the ignition timing may be adjusted up to a threshold amount of adjustment either before or while the air-fuel mixture adjustment occurs. When an engine acceleration is determined the ignition timing may be advanced and the air-fuel mixture may be enriched. When an engine deceleration is determined the ignition timing may be retarded and the air-fuel mixture may be enriched. In at least some engine systems, the air-fuel mixture is controlled by controlling a valve that reduces fuel flow to the engine and the air-fuel mixture may be controlled by reducing the period of time that the valve reduces fuel flow to the engine to enrich the mixture or by increasing the time that the valve reduces fuel flow to the engine to enlean the mixture.

BRIEF DESCRIPTION OF THE DRAWINGS

The following detailed description of preferred implementations and best mode will be set forth with regard to the accompanying drawings, in which.

DETAILED DESCRIPTION

Figure 1:
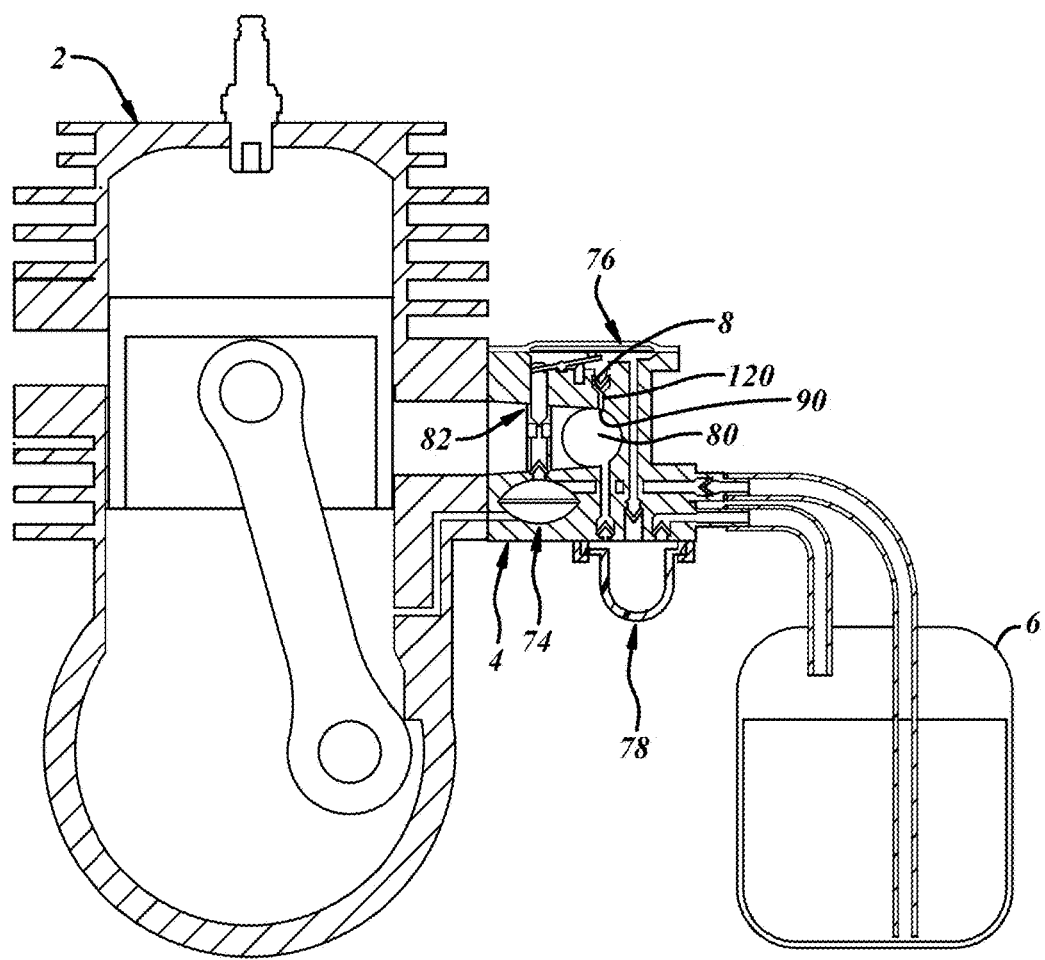
FIG. 1 is a schematic view of an engine and a carburetor including a fuel mixture control device.

Referring in more detail to the drawings, FIG. 1 illustrates an engine 2 and a charge forming device 4 that delivers a fuel and air mixture to the engine 2 to support engine operation. In at least one implementation, the charge forming device 4 includes a carburetor, and the carburetor may be of any suitable type including, for example, diaphragm and float bowl carburetors. A diaphragm-type carburetor 4 is shown in FIG. 1. The carburetor 4 takes in fuel from a fuel tank 6 and includes a mixture control device 8 capable of altering the air/fuel ratio of the mixture delivered from the carburetor. To determine a desired instantaneous air/fuel ratio, a comparison is made of the engine speed before and after the air/fuel ratio is altered. Based upon that comparison, the mixture control device 8 or some other component may be used to alter the fuel and air mixture to provide a desired air/fuel ratio.

Figure 2:
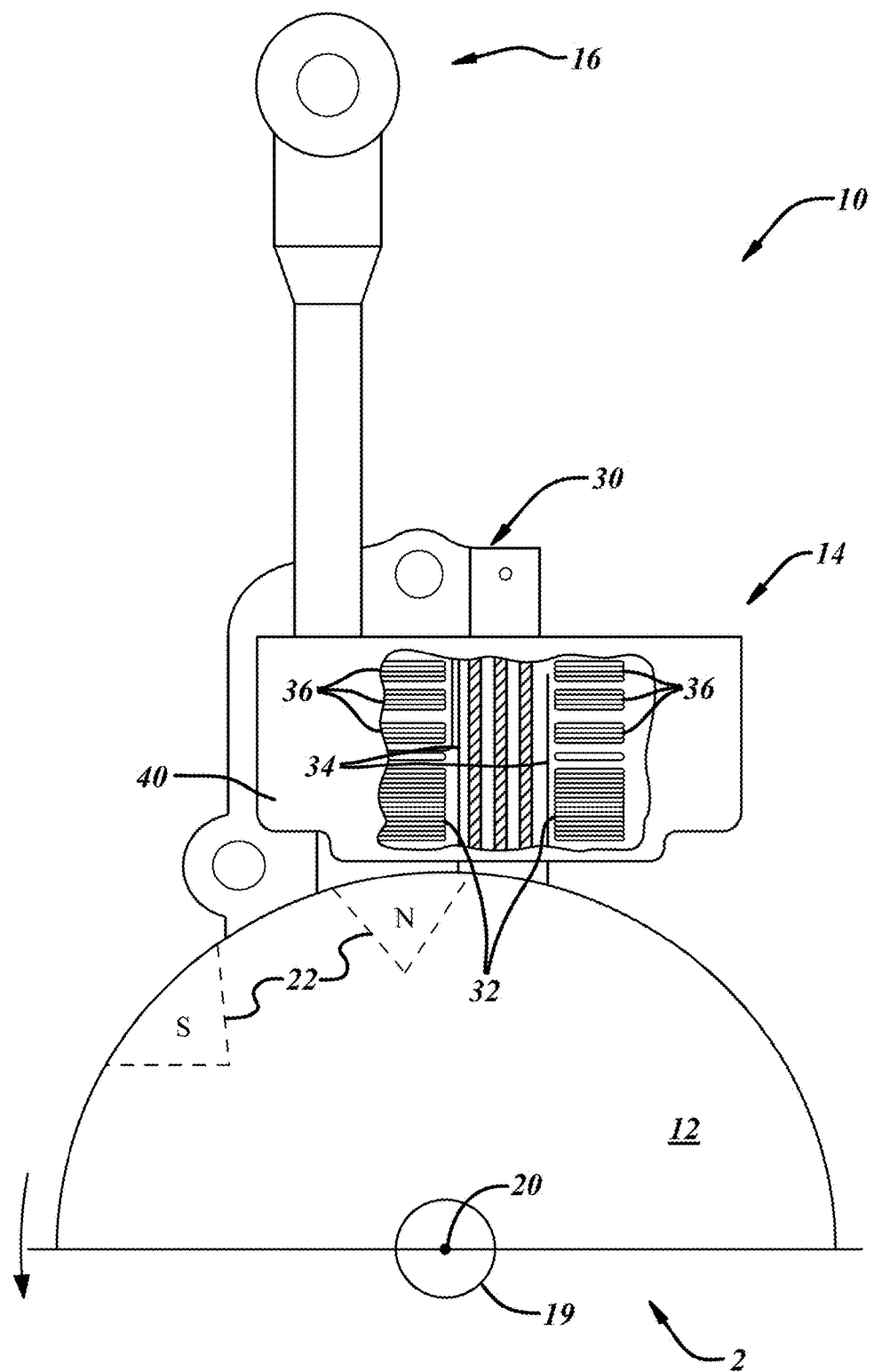
FIG. 2 is a fragmentary view of a flywheel and ignition components of the engine.
Figure 3:
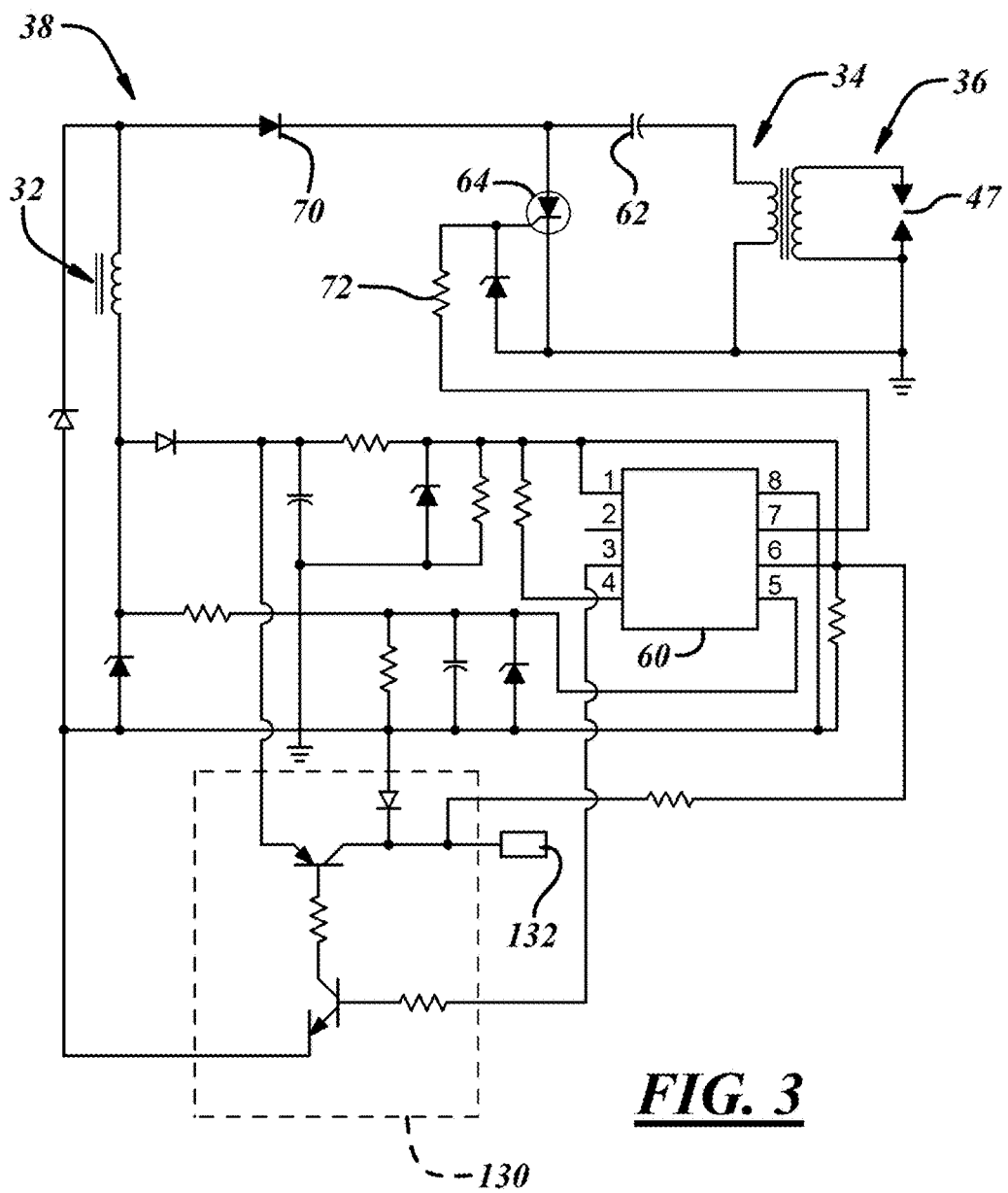
FIG. 3 is a schematic diagram of an ignition circuit.

The engine speed may be determined in a number of ways, one of which uses signals within an ignition system 10 such as may be generated by a magnet on a rotating flywheel 12. FIGS. 2 and 3 illustrates an exemplary signal generation or ignition system 10 for use with an internal combustion engine 2, such as (but not limited to) the type typically employed by hand-held and ground-supported lawn and garden equipment. Such equipment includes chainsaws, trimmers, lawn mowers, and the like. The ignition system 10 could be constructed according to one of numerous designs, including magneto or capacitive discharge designs, such that it interacts with an engine flywheel 12 and generally includes a control system 14, and an ignition boot 16 for connection to a spark plug (not shown).

The flywheel 12 rotates about an axis 20 under the power of the engine 2 and includes magnets or magnetic sections 22. As the flywheel 12 rotates, the magnetic sections 22 spin past and electromagnetically interact with components of the control system 14 for sensing engine speed among other things.

The control system 14 includes a ferromagnetic stator core or lamstack 30 having wound thereabout a charge winding 32, a primary ignition winding 34, and a secondary ignition winding 36. The primary and secondary windings 34, 36 basically define a step-up transformer or ignition coil used to fire a spark plug. The control system also includes a circuit 38 (shown in FIG. 3), and a housing 40, wherein the circuit 38 may be located remotely from the lamstack 30 and the various windings. As the magnetic sections 22 are rotated past the lamstack 30, a magnetic field is introduced into the lamstack 30 that, in turn, induces a voltage in the various windings. For example, the rotating magnetic sections 22 induce a voltage signal in the charge winding 32 that is indicative of the number of revolutions of the engine 2 in the control system. The signal can be used to determine the rotational speed of the flywheel 12 and crankshaft 19 and, hence, the engine 2. Finally, the voltage induced in the charge winding 32 is also used to power the circuit 38 and charge an ignition discharge capacitor 62 in known manner. Upon receipt of a trigger signal, the capacitor 62 discharges through the primary winding 34 of the ignition coil to induce a stepped-up high voltage in the secondary winding 36 of the ignition coil that is sufficient to cause a spark across a spark gap of a spark plug 47 to ignite a fuel and air mixture within a combustion chamber of the engine.

In normal engine operation, downward movement of an engine piston during a power stroke drives a connecting rod (not shown) that, in turn, rotates the crankshaft 19, which rotates the flywheel 12. As the magnetic sections 22 rotate past the lamstack 30, a magnetic field is created which induces a voltage in the nearby charge winding 32 which is used for several purposes. First, the voltage may be used to provide power to the control system 14, including components of the circuit 38. Second, the induced voltage is used to charge the main discharge capacitor 62 that stores the energy until it is instructed to discharge, at which time the capacitor 62 discharges its stored energy across primary ignition winding 34. Lastly, the voltage induced in the charge winding 32 is used to produce an engine speed input signal, which is supplied to a microcontroller 60 of the circuit 38. This engine speed input signal can play a role in the operation of the ignition timing, as well as controlling an air/fuel ratio of a fuel mixture delivered to the engine, as set forth below.

Referring now primarily to FIG. 3, the control system 14 includes the circuit 38 as an example of the type of circuit that may be used to implement the ignition timing control system 14. However, many variations of this circuit 38 may alternatively be used without departing from the scope of the invention. The circuit 38 interacts with the charge winding 32, primary ignition winding 34, and preferably a kill switch, and generally comprises the microcontroller 60, an ignition discharge capacitor 62, and an ignition thyristor 64.

The microcontroller 60 as shown in FIG. 3 may be an 8-pin processor, which utilizes internal memory or can access other memory to store code as well as for variables and/or system operating instructions. Any other desired controllers, microcontrollers, or microprocessors may be used, however. Pin 1 of the microcontroller 60 is coupled to the charge winding 32 via a resistor and diode, such that an induced voltage in the charge winding 32 is rectified and supplies the microcontroller with power. Also, when a voltage is induced in the charge winding 32, as previously described, current passes through a diode 70 and charges the ignition discharge capacitor 62, assuming the ignition thyristor 64 is in a nonconductive state. The ignition discharge capacitor 62 holds the charge until the microcontroller 60 changes the state of the thyristor 64. Microcontroller pin 5 is coupled to the charge winding 32 and receives an electronic signal representative of the engine speed. The microcontroller uses this engine speed signal to select a particular operating sequence, the selection of which affects the desired spark timing. Pin 7 is coupled to the gate of the thyristor 64 via a resistor 72 and transmits from the microcontroller 60 an ignition signal which controls the state of the thyristor 64. When the ignition signal on pin 7 is low, the thyristor 64 is nonconductive and the capacitor 62 is allowed to charge. When the ignition signal is high, the thyristor 64 is conductive and the capacitor 62 discharges through the primary winding 34, thus causing an ignition pulse to be induced in the secondary winding 36 and sent on to the spark plug 47. Thus, the microcontroller 60 governs the discharge of the capacitor 62 by controlling the conductive state of the thyristor 64. Lastly, pin 8 provides the microcontroller 60 with a ground reference.

To summarize the operation of the circuit, the charge winding 32 experiences an induced voltage that charges ignition discharge capacitor 62, and provides the microcontroller 60 with power and an engine speed signal. The microcontroller 60 outputs an ignition signal on pin 7, according to the calculated ignition timing, which turns on the thyristor 64. Once the thyristor 64 is conductive, a current path through the thyristor 64 and the primary winding 34 is formed for the charge stored in the capacitor 62. The current discharged through the primary winding 34 induces a high voltage ignition pulse in the secondary winding 36. This high voltage pulse is then delivered to the spark plug 47 where it arcs across the spark gap thereof, thus igniting an air/fuel charge in the combustion chamber to initiate the combustion process.

As noted above, the microcontroller 60, or another controller, may play a role in altering an air/fuel ratio of a fuel mixture delivered by a carburetor 4 (for example) to the engine 2. In the embodiment of FIG. 1, the carburetor 4 is a diaphragm type carburetor with a diaphragm fuel pump assembly 74, a diaphragm fuel metering assembly 76, and a purge/prime assembly 78, the general construction and function of each of which is well-known. The carburetor 4 includes a fuel and air mixing passage 80 that receives air at an inlet end and fuel through a fuel circuit 82 supplied with fuel from the fuel metering assembly 76. The fuel circuit 82 includes one or more passages, port and/or chambers formed in a carburetor main body. One example of a carburetor of this type is disclosed in U.S. Pat. No. 7,467,785, the disclosure of which is incorporated herein by reference in its entirety. The mixture control device 8 is operable to alter the flow of fuel in at least part of the fuel circuit to alter the air/fuel ratio of a fuel mixture delivered from the carburetor 4 to the engine to support engine operation as commanded by a throttle.

Figure 5:
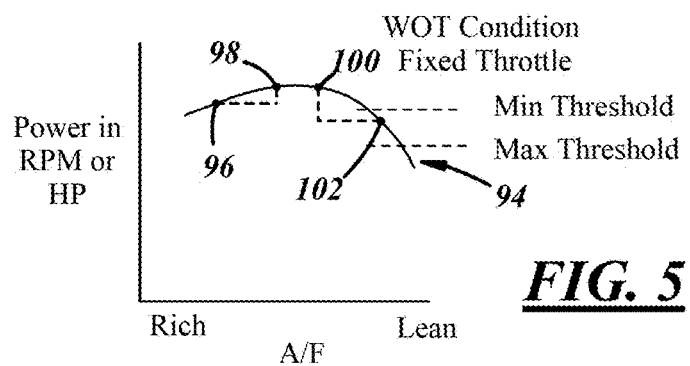
FIG. 5 is a graph of a representative engine power curve.

For a given throttle position, the power output for an engine will vary as a function of the air/fuel ratio. A representative engine power curve 94 is shown in FIG. 5 as a function of air/fuel ratio, where the air/fuel ratio becomes leaner from left-to-right on the graph. This curve 94 shows that the slope of the curve on the rich side is notably less than the slope of the curve on the lean side. Hence, when a richer fuel mixture is enleaned the engine speed will generally increase by a lesser amount than when a leaner fuel mixture is enleaned by the same amount. This is shown in FIG. 5, where the amount of enleanment between points 96 and 98 is the same as between points 100 and 102, yet the engine speed difference is greater between points 100 and 102 than it is between points 96 and 98. In this example, points 96 and 98 are richer than a fuel mixture that corresponds to engine peak power output, while point 100 corresponds to a fuel mixture that provides engine peak power output and point 102 is leaner than all of the other points.

Figure 4:
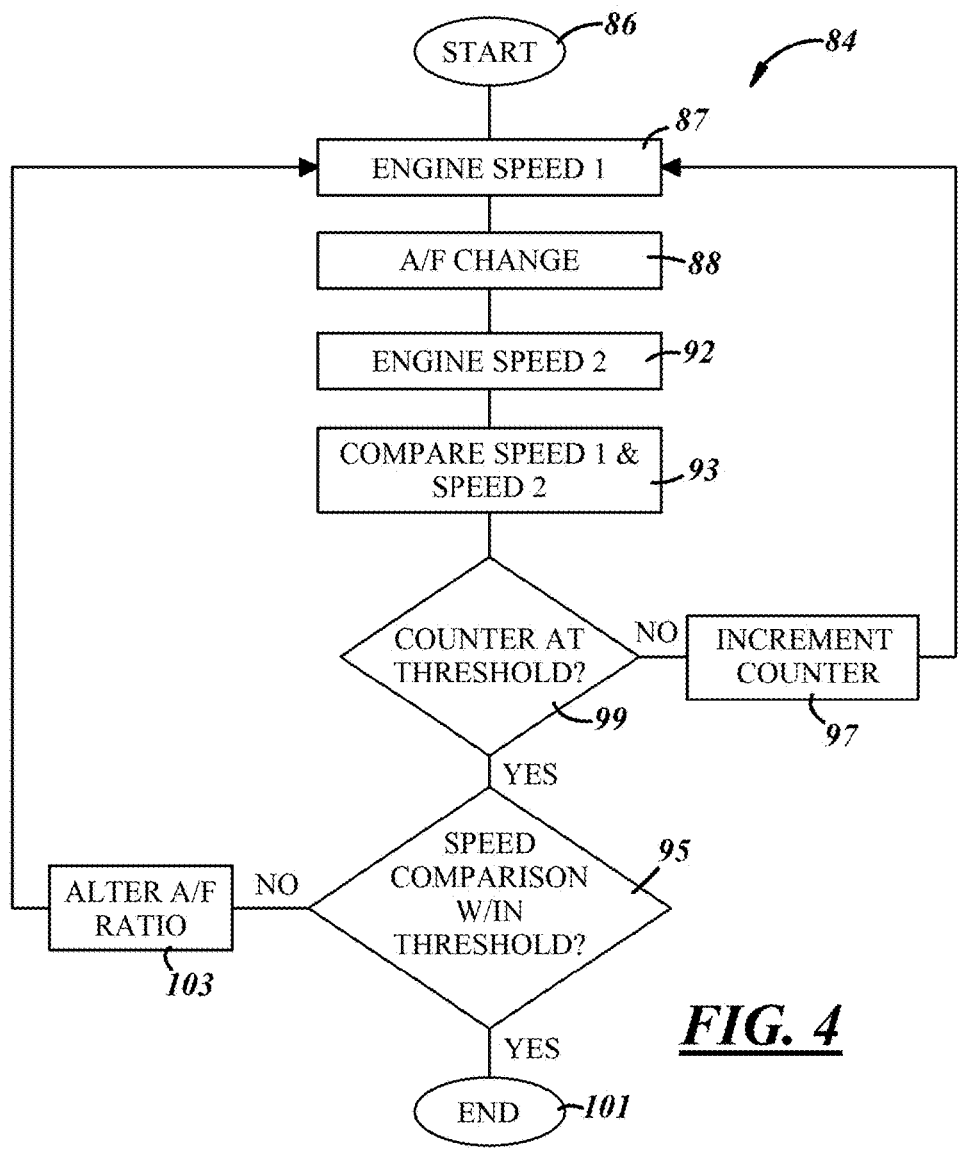
FIG. 4 is a flowchart for an engine control process.

The characteristics of the engine power curve 94 may be used in an engine control process 84 that determines a desired air/fuel ratio for a fuel mixture delivered to the engine. One example of an engine control process 84 is shown in FIG. 4 and includes an engine speed test wherein engine speed is determined as a function of a change in the air/fuel ratio of the fuel mixture, and an analysis portion where data from the engine speed test is used to determine or confirm a desired air/fuel ratio of the fuel mixture.

The engine control process 84 begins at 86 and includes one or more engine speed tests. Each engine speed test may essentially include three steps. The steps include measuring engine speed at 87, changing the air/fuel ratio of the fuel mixture provided to the engine at 88, and then measuring the engine speed again at 92 after at least a portion of the air/fuel ratio change has occurred.

The first step is to measure the current engine speed before the fuel mixture is enleaned. Engine speed may be determined by the microcontroller 60 as noted above, or in any other suitable way. This is accomplished, in one implementation, by measuring three engine speed parameters with the first being the cyclic engine speed. This is the time difference for one revolution of the engine. In most engines, there is a large amount of repeatable cyclic engine speed variation along with a significant amount of non-repeatable cyclic engine speed variation. This can be seen in FIG. 6, where the cyclic engine speed is shown at 104. Because this cyclic variability is difficult to use in further determinations, a rolling average (called F1-XX) is created, where XX is the number of revolutions being averaged, and generally F1 is a low averaging value such as 4 or 6. This greatly eliminates the large repeatable cyclic engine speed variation but does not dampen out too much the non-repeatable cyclic engine speed variation. The third engine speed value is F2-XX, and F2 is a greater averaging value, such as 80 revolutions. This amount of averaging greatly dampens out any variations of speed change and the intent is to dampen out the effect of the enleanment engine speed change. Now that there are two usable rpm values, F1-6 and F2-80 in this example, the difference of these values can be used to represent the engine speed change caused by the enleanment of the fuel mixture during an engine speed test.

In addition to measuring engine speed, the engine speed test includes changing the air/fuel ratio of the fuel mixture delivered to the engine. This may be accomplished with the mixture control device, e.g. solenoid valve 8 may be actuated thereby changing an air/fuel ratio of a mixture delivered to the engine 2 from the carburetor 4. In at least some implementations, the solenoid valve 8 may be actuated to its closed position to reduce fuel flow to a main fuel port or jet 90, thereby enleaning the fuel and air mixture. The valve 8 may be closed for a specific time period, or a duration dependent upon an operational parameter, such as engine speed. In one form, the valve 8 is closed (or nearly closed) for a certain number or range of engine revolutions, such as 1 to 150 revolutions. This defines an enleanment period wherein the leaner fuel and air mixture is delivered to the engine 2. Near, at or just after the end of the enleanment period, the engine speed is again determined at 92 as noted above.

Figure 6:
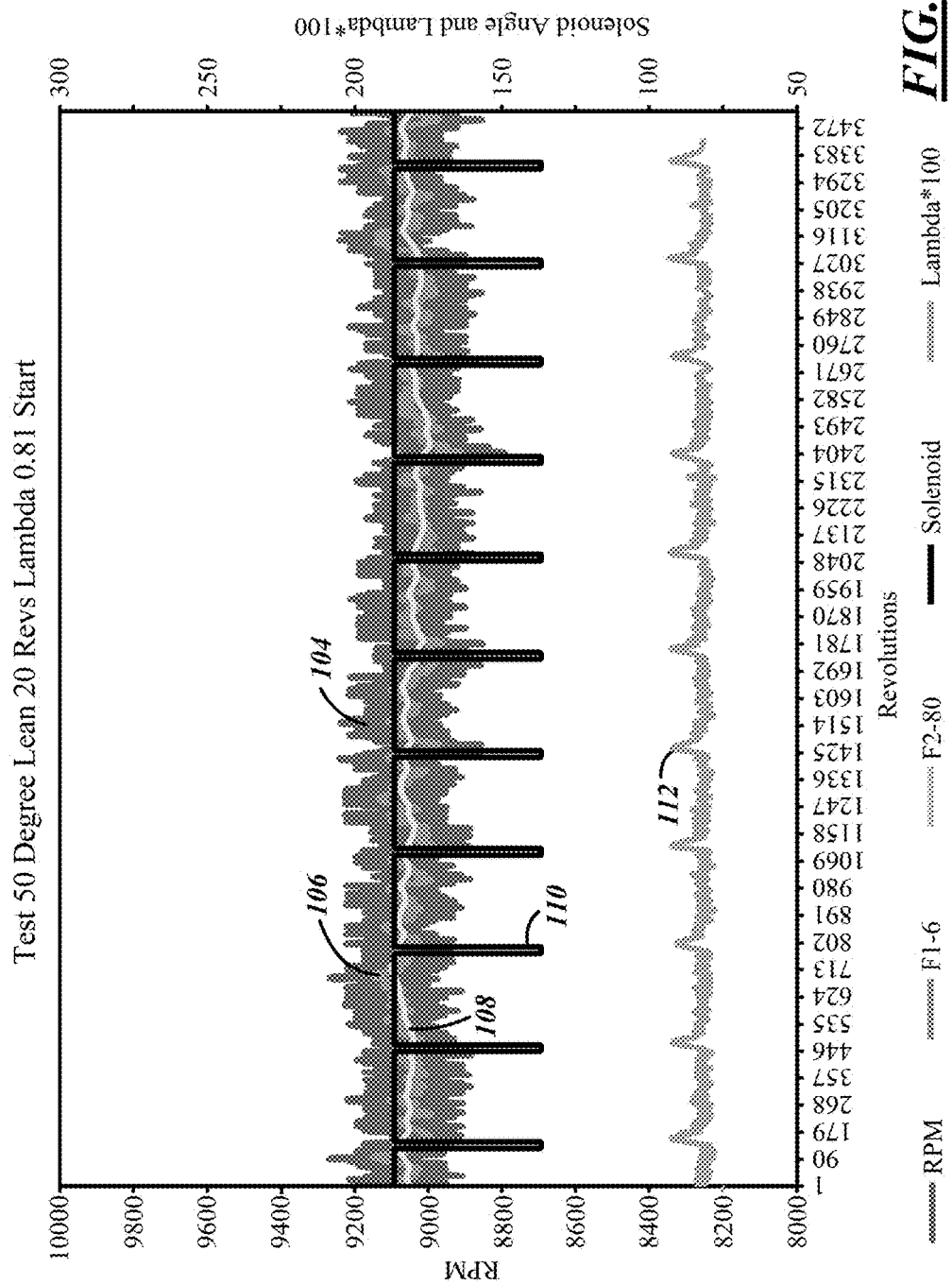
FIGS. 6-8 are graphs showing several variables that may be tracked during an engine speed test.
Figure 7:
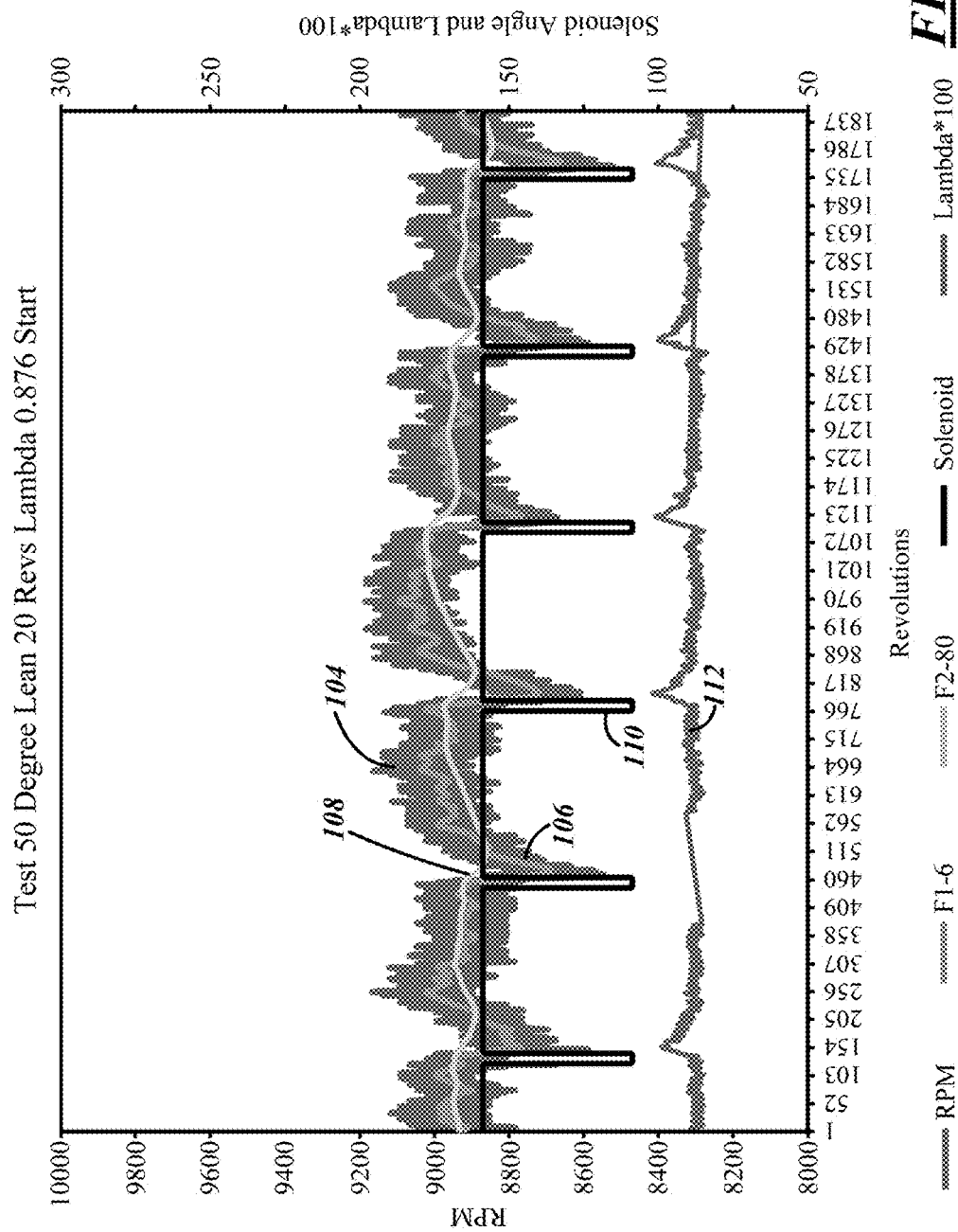
Figure 8:
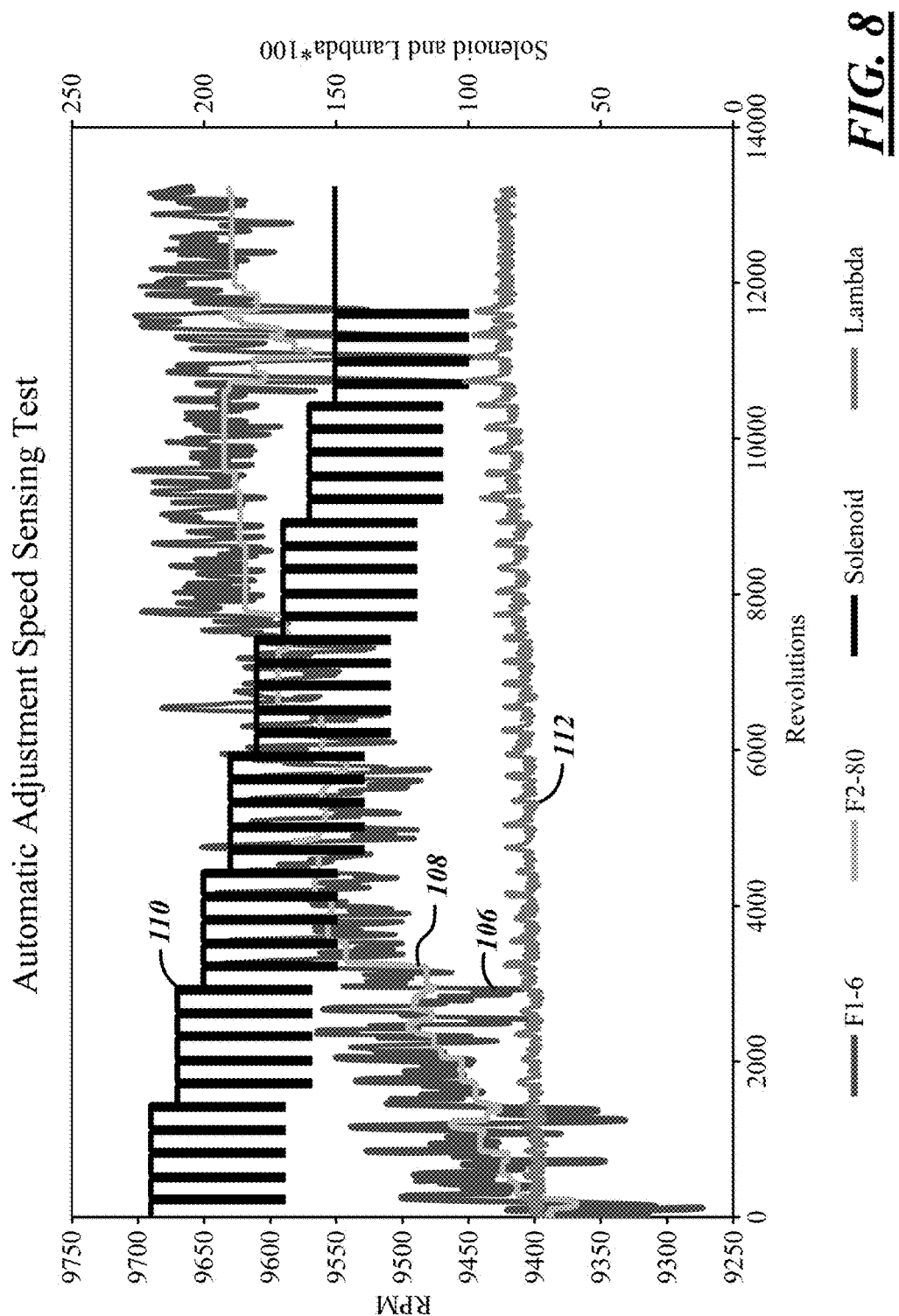

FIGS. 6-8 show engine speed (in rpm) versus number of engine revolutions during one or more engine speed tests. F1-6 is shown by line 106, F2-80 is shown by line 108, the solenoid actuation signal is shown by line 110, and a fuel/air ratio (Lambda) is shown by line 112.

FIG. 6 shows the initial air/fuel ratio to be rich at Lambda=0.81. The amount of enleanment in the example test was 50 degrees for 20 revolutions. This means that the solenoid valve was actuated 50 degrees earlier in the engine stroke than it would have been for normal engine operation (e.g. operation other than during the test). The increased duration of solenoid actuation leads to an enleaned fuel mixture. From this enleanment, the average rpm difference of F1-6 and F2-80 is 30 rpm. Because the enleanment is so large, 50 degrees, a decrease of 30 rpm is observed even though the initial air/fuel ratio is still 6% richer than a fuel mixture ratio that would yield peak engine power.

FIG. 7 shows the same 50 degree enleanment test for 20 revolutions but the starting air/fuel ratio is at Lambda=0.876 which approximately corresponds to peak engine power. The average engine speed difference between F1-6 and F2-80 in this example is 148 rpm, approximately five times greater than the speed difference from a starting air/fuel ration of Lambda=0.81.

Because the process as described involves enleaning a fuel mixture, the initial or calibrated air/fuel ratio should be richer than desired. This ensures that at least some enleanment will lead to a desired air/fuel ratio. In at least some implementations, the initial air/fuel ratio may be up to about 30% richer than the fuel mixture corresponding to peak engine power. Instead of or in addition to enleaning, enriching the fuel mixture may be possible in a given carburetor construction, and in that case the engine speed test could include an enriching step if an unduly lean air/fuel ratio where determined to exist. Enriching may be done, for example, by causing additional fuel to be supplied to the engine, or by reducing air flow. The process may be simpler by starting with a richer fuel mixture and enleaning it, as noted herein.

Referring again to the engine control process shown in FIG. 4, the two engine speed measurements obtained at 87 and 92 are compared at 93. To improve the accuracy of the engine control process, several engine speed tests may be performed, with a counter incremented at 97 after each engine speed test, and the counter compared to a threshold at 99 to determine if a desired number of engine speed tests have been performed. If a desired number of tests have been performed, the process 84 then analyzes the data from the engine speed test(s).

To determine whether the fuel mixture delivered to the engine before the engine speed tests were performed was within a desired range of air/fuel ratios, the engine speed differences determined at 93 are compared against one or more thresholds at 95. Minimum and maximum threshold values may be used for the engine speed difference that occurs as a result of enleaning the fuel mixture provided to the engine. An engine speed difference that is below the minimum threshold (which could be a certain number of rpm's) likely indicates that the air/fuel ratio before that enleanment was richer than a mixture corresponding to peak engine power. Conversely, an engine speed difference that is above the maximum threshold (which could be a certain number of rpm's) indicates that the air/fuel ratio became too lean (indicating the fuel mixture started leaner than a peak power fuel mixture, as noted above). In at least some implementations, the minimum threshold is 15 rpm, and the maximum threshold is 500 rpm or higher. These values are intended to be illustrative and not limiting—different engines and conditions may permit use of different thresholds.

In the process 84 shown in FIG. 4, the engine speed test is performed multiple times in a single iteration of the process 84. In one iteration of the process 84, it is determined at 95 if the engine speed difference of any one or more of the engine speed tests is within the threshold values, and if so, the process may end at 101. That is, if a threshold number (one or more) of the determined engine speed differences from 93 are within the thresholds, the process may end because the starting air/fuel ratio (e.g. the air/fuel ratio of the mixture prior to the first engine speed test of that process iteration) is at or within an acceptable range of a desired air/fuel ratio. In one implementation, five engine speed tests may be performed, and an engine speed difference within the thresholds may be required from at least three of the five engine speed tests. Of course, any number of engine speed tests may be performed (including only one) and any number of results within the thresholds may be required (including only one and up to the number of engine speed tests performed).

If a threshold number of engine speed differences (determined at 93) are not within the thresholds, the air/fuel ratio of the mixture may be altered at 103 to a new air/fuel ratio and the engine speed tests repeated using the new air/fuel ratio. At 95, if an undesired number of engine speed differences were less than the minimum threshold, the air/fuel ratio of the fuel mixture may be enleaned at 103 before the engine speed tests are repeated. This is because an engine speed difference less than the minimum threshold indicates the fuel mixture at 87 was too rich. Hence, the new air fuel ratio from 103 is leaner than when the prior engine speed tests were performed. This can be repeated until a threshold number of engine speed differences are within the thresholds, which indicates that the fuel mixture provided to the engine before the engine speed tests were conducted (e.g. at 87) is a desired air/fuel ratio. Likewise, at 95, if an undesired number of engine speed differences were greater than the maximum threshold, the air/fuel ratio of the fuel mixture may be enleaned less, or even enriched, at 103 before the engine speed tests are repeated. This is because an engine speed difference greater than the maximum threshold indicates the fuel mixture at 87 was too lean. Hence, the new air fuel ratio from 103, in this instance, is richer than when the prior engine speed tests were performed. This also can be repeated until a threshold number of engine speed differences are within the thresholds, with a different starting air/fuel ratio for each iteration of the process.

When a desired number of satisfactory engine speed differences (i.e. between the thresholds) occur at a given air/fuel ratio, that air/fuel ratio may be maintained for further operation of the engine. That is, the solenoid valve 8 may be actuated during normal engine operation generally in the same manner it was for the engine speed tests that provided the satisfactory results.

FIG. 8 shows a fuel mixture adjustment test series starting from a rich air/fuel ratio of about Lambda=0.7, and ending with an air/fuel ratio of about Lambda=0.855. In this series, the enleanment step was repeated several times until a desired number of engine speed differences within the thresholds occurred. That resulted in a chosen air/fuel ratio of about Lambda=0.855, and the engine may thereafter be operated with a fuel mixture at or nearly at that value for improved engine performance by control of the solenoid valve 8 or other mixture control device(s).

As noted above, instead of trying to find an engine speed difference (after changing the air/fuel ratio) that is as small as possible to indicate the engine peak power fuel mixture, the process may look for a relatively large engine speed difference, which may be greater than a minimum threshold. This may be beneficial because it can sometimes be difficult to determine a small engine speed difference during real world engine usage, when the engine is under load and the load may vary during the air/fuel ratio testing process. For example, the engine may be used with a tool used to cut grass (e.g. weed trimmer) or wood (e.g. chainsaw). Of course, the engine could be used in a wide range of applications. By using a larger speed difference in the process, the "noise" of the real world engine load conditions have less of an impact on the results. In addition, as noted above, there can be significant variances in cyclic speed during normal operation of at least some small engines making determination of smaller engine speed differences very difficult.

As noted above, the engine load may change as a tool or device powered by the engine is in use. Such engine operating changes may occur while the engine speed test is being conducted. To facilitate determining if an engine operating condition (e.g. load) has changed during the engine speed test, the engine speed may be measured a third time, a sufficient period of time after the air/fuel ratio is changed during an engine speed test to allow the engine to recover after the air/fuel ratio change. If the first engine speed (taken before the fuel mixture change) and the third engine speed (taken after the fuel mixture change and after a recovery period) are significantly different, this may indicate a change in engine load occurred during the test cycle. In that situation, the engine speed change may not have been solely due to the fuel mixture change (enleanment) during the engine speed test. That test data may either be ignored (i.e. not used in further calculation) or a correction factor may be applied to account for the changed engine condition and ensure a more accurate air/fuel ratio determination.

In one form, and as noted above, the mixture control device that is used to change the air/fuel ratio as noted above includes a valve 8 that interrupts or inhibits a fluid flow within the carburetor 4. In at least one implementation, the valve 8 affects a liquid fuel flow to reduce the fuel flow rate from the carburetor 4 and thereby enlean the fuel and air mixture delivered from the carburetor to the engine. The valve may be electrically controlled and actuated. An example of such a valve is a solenoid valve. The valve 8 may be reciprocated between open and closed positions when the solenoid is actuated. In one form, the valve prevents or at least inhibits fuel flow through a passage 120 (FIG. 1) when the valve is closed, and permits fuel flow through the passage when the valve is opened. As shown, the valve 8 is located to control flow through a portion of the fuel circuit that is downstream of the fuel metering assembly and upstream of a main fuel jet that leads into the fuel and air mixing passage. Of course, the valve 8 may be associated with a different portion of the fuel circuit, if desired. By opening or closing the valve 8, the flow rate of fuel to the main fuel jet is altered (i.e. reduced when the valve is closed) as is the air/fuel ratio of a fuel mixture delivered from the carburetor. A rotary throttle valve carburetor, while not required, may be easily employed because all fuel may be provided to the fuel and air mixing passage from a single fuel circuit, although other carburetors may be used.

In some engine systems, an ignition circuit 38 may provide the power necessary to actuate the solenoid valve 8. A controller 60 associated with or part of the ignition circuit 38 may also be used to actuate the solenoid valve 8, although a separate controller may be used. As shown in FIG. 3, the ignition circuit 38 may include a solenoid driver subcircuit 130 communicated with pin 3 of the controller 60 and with the solenoid at a node or connector 132. The controller may be a programmable device and may have various tables, charts or other instructions accessible to it (e.g. stored in memory accessible by the controller) upon which certain functions of the controller are based.

The timing of the solenoid valve, when it is energized during the portion of the time when fuel is flowing into the fuel and air mixing passage, may be controlled as a calibrated state in order to determine the normal air/fuel ratio curve. To reduce power consumption by the solenoid, the fuel mixture control process may be implemented (that is, the solenoid may be actuated) during the later portion of the time when fuel flows to the fuel and air mixing passage (and fuel generally flows to the fuel metering chamber during the engine intake stroke). This reduces the duration that the solenoid must be energized to achieve a desired enleanment. Within a given window, energizing the solenoid earlier within the fuel flow time results in greater enleanment and energizing the solenoid later results in less enleanment. In one example of an enleanment test, the solenoid may be energized during a brief number of revolutions, such as 30. The resultant engine speed would be measured around the end of this 30 revolution enleanment period, and thereafter compared with the engine speed before the enleanment period.

With a 4-stroke engine, the solenoid actuated enleanment may occur every other engine revolution or only during the intake stroke. This same concept of operating the solenoid every other revolution could work on a 2-stroke engine with the main difference being the solenoid energized time would increase slightly. At slower engine speeds on a 2-stroke engine the solenoid control could then switch to every revolution which may improve both engine performance and system accuracy.

Figure 11:
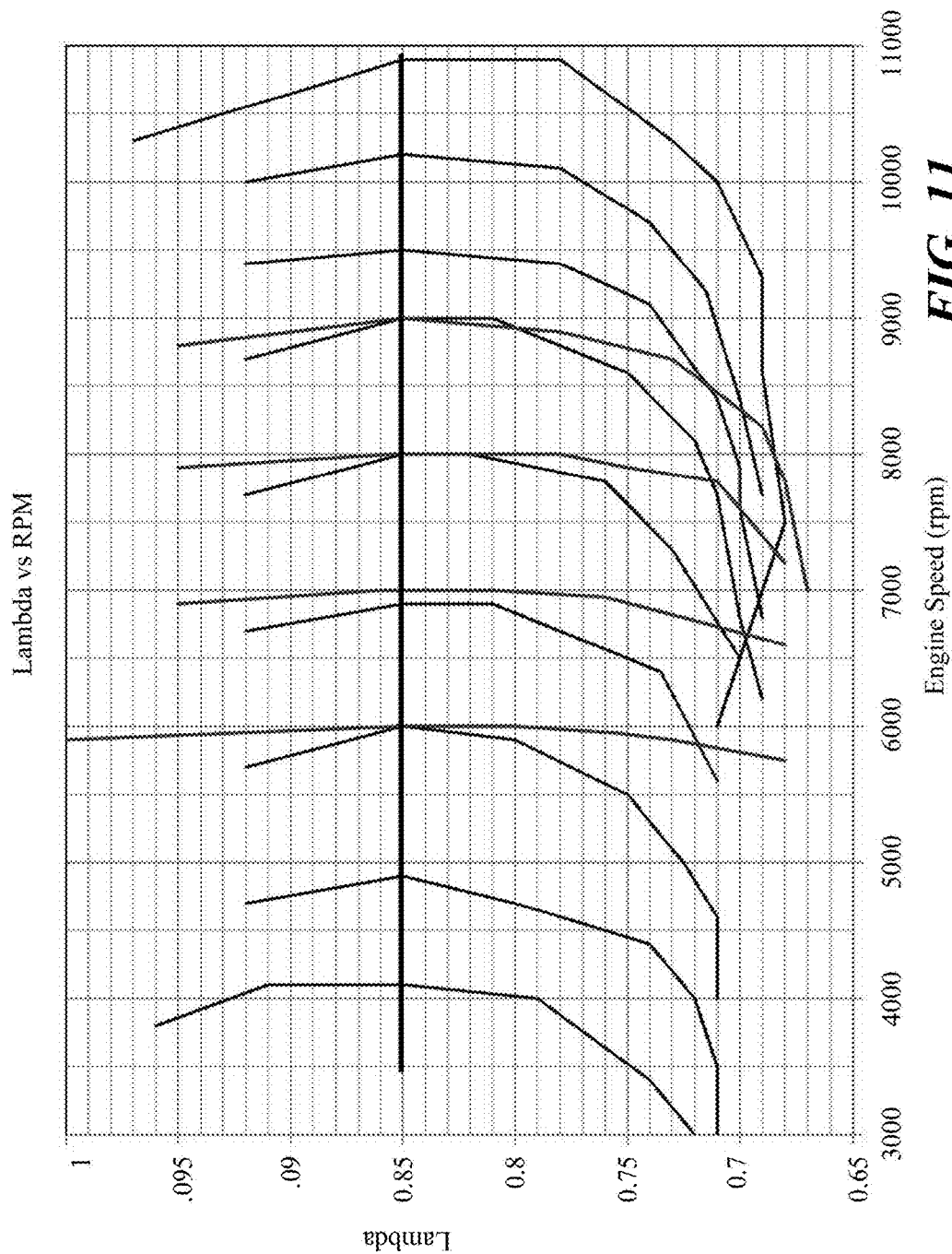
FIG. 11 is a graph of curves of lambda versus engine speed for a four-stroke single cylinder small displacement engine.

FIG. 11 illustrates lambda versus RPM curves for a spark ignited gasoline powered four-stroke engine with a displacement of 25 cubic centimeters ($cm^3$). This is a single cylinder engine with a diaphragm carburetor 4 of the type shown in FIG. 1 which includes a mixture control device 8, such as a normally open solenoid valve, an ignition system 10, control system 14, and a control circuit such as the control circuit 38 with a microcontroller 60. This engine was designed to be used on a lawn trimmer which may have a working head such as a string trimmer or a rotary blade trimmer. This engine may have a peak power output in the range of about 6,000 rpm to 11,000 rpm with a lambda air-to-fuel ratio of substantially 0.85.

Figure 12A:
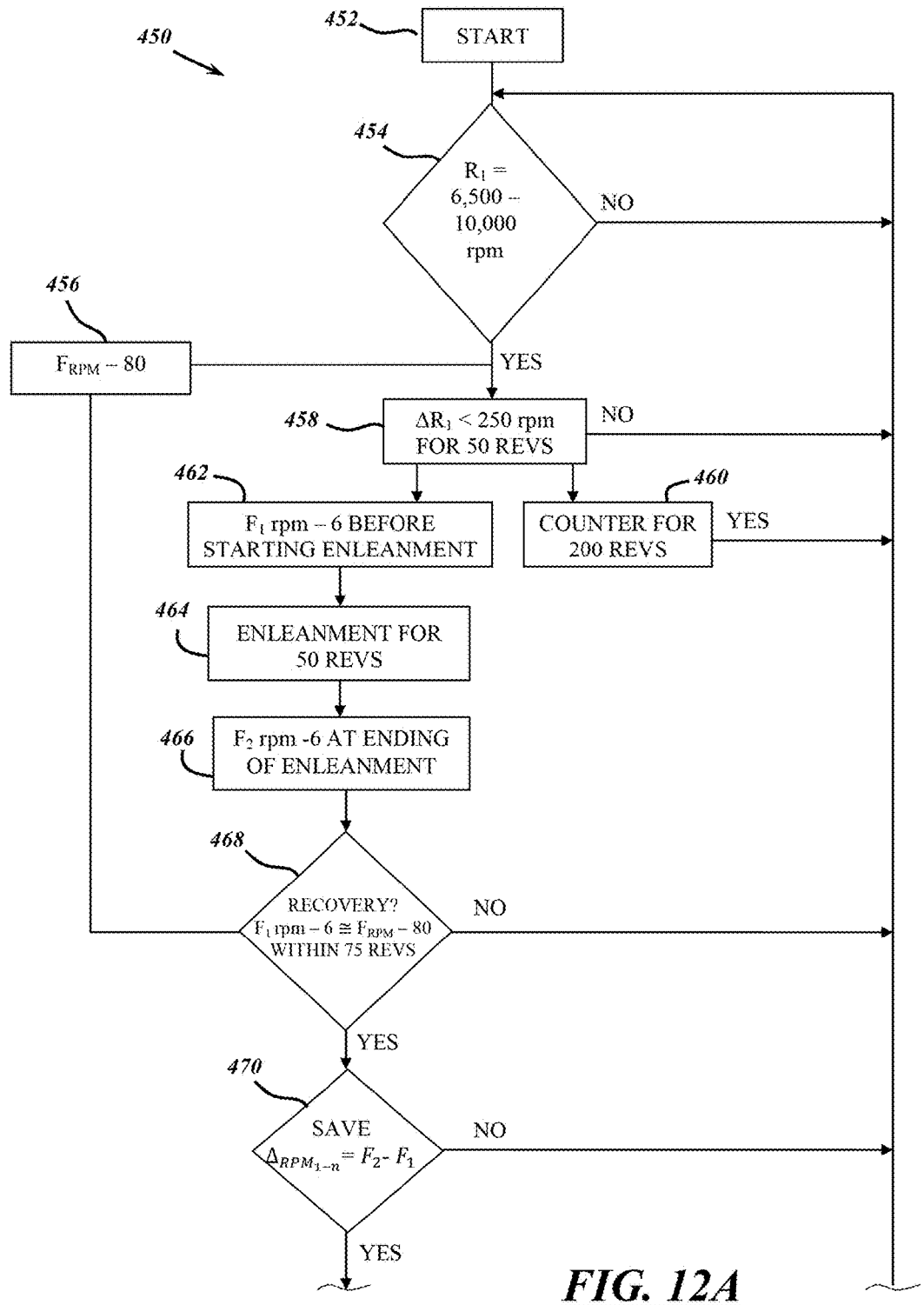
FIG. 12A is an initial part of a flow chart for an engine fuel control process.
Figure 12B:
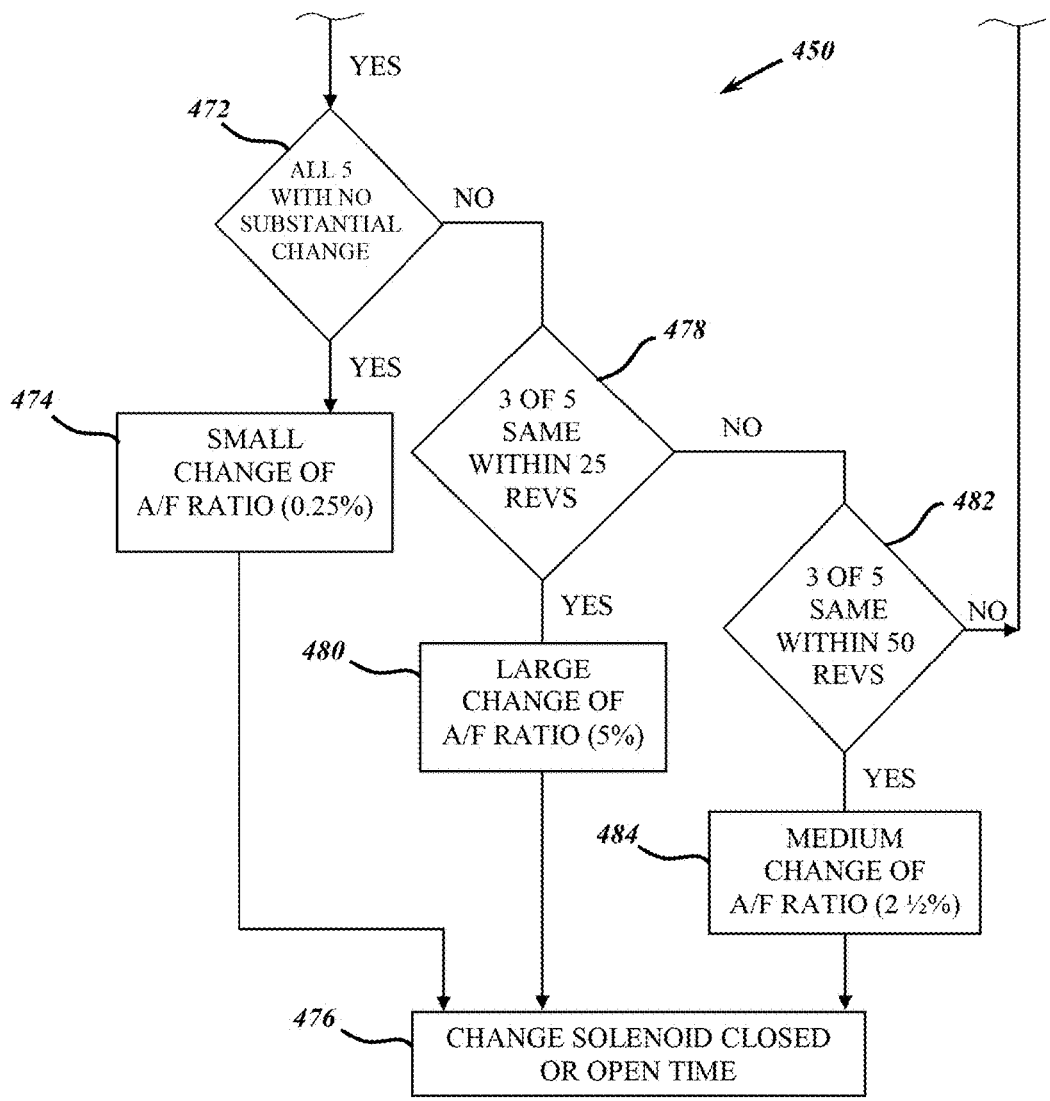
FIG. 12B is the rest of the flow chart of FIG. 12A for the engine fuel control process.
Figure 13:
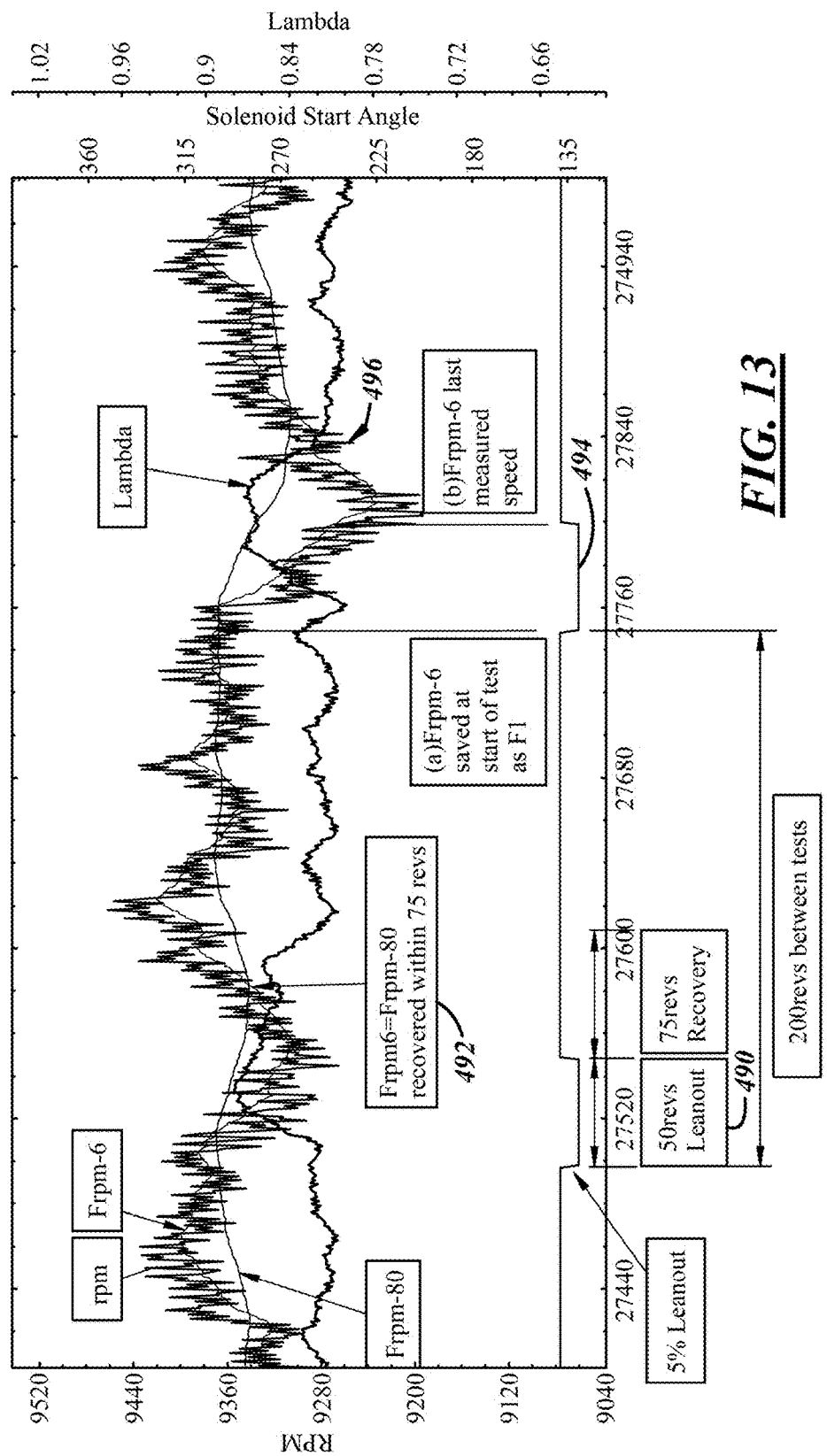
FIG. 13 is a graph showing various variables of the engine fuel control process of FIGS. 12A and 12B of a four-stroke single cylinder engine.

FIGS. 12A and 12B combined, provide a flow chart of at least some of the steps of a fuel control process which may be used to determine and control the air-to-fuel ratio of a small displacement engine which may have a single cylinder with a displacement in the range of about 15-60 cubic centimeters ($cm^3$) including such an engine normally operating in the range of about 3,000-11,000 rpm such as, for example, the spark ignited gasoline powered single cylinder engine with a 25 $cm^3$ displacement with the lambda curves of FIG. 11. FIG. 13 illustrates a graph of engine speed and lambda data of this engine having the lambda versus RPM curves of FIG. 11 during a portion of the process of the flow chart of FIGS. 12A and 12B.

As shown in FIGS. 12A and 12B an engine control process 450 begins at 452 typically on or shortly after engine start up and proceeds to step 454 to determine if the engine is operating at a speed $R_1$ significantly greater than its idling speed, such as in the range of 6,500-10,000 rpm. If not, it returns to the start and repeats step 454 until it has determined that the engine is operating in the speed range $R_1$ and if so, proceeds to both the steps 456 and 458. In step 456, the microcontroller accumulates and stores the engine speed for 80 consecutive revolutions ($F_{RPM}$–80) on a first in, first out (FIFO) basis for use in a downstream step.

In step 458, it is determined whether or not the engine is operating at a relatively constant or stable speed by determining whether the engine speed varied by less than 250 rpm over a period of 50 consecutive revolutions. If not, the process returns to step 454. If so, the process advances to steps 460 and 462. In step 460, microcontroller counts a number of consecutive engine revolutions, such as 200 revolutions, and when it reaches 200 revolutions returns the process to step 454 and begins counting the next 200 engine revolutions. Thus, all of the remaining steps are accomplished within 200 engine revolutions or aborted and returned to step 454.

In step 462, either a total or average engine speed for 6 revolutions ($F_1$ rpm–6) is determined and held in a buffer immediately before starting a fuel mixture enleanment step 464. In step 464, the air-to-fuel ratio supplied by the carburetor to the operating engine is enleaned for a fixed number of engine revolutions significantly greater than $F_1$ rpm–6 such as, for example, 50 revolutions. In step 466, the engine speed is determined for a small number of revolutions near or at the end of the enleanment of step 464, such as the last six revolutions of the enleanment ($F_2$ rpm–6) and stored for potential use in some subsequent steps.

After ending of the enleanment, the process may advance to step 468 to determine whether the engine has recovered from the enleanment after the air-to-fuel ratio returns to that used before the start of the enleanment. In step 468 and as shown in FIG. 13, a comparison is made between the engine speed $F_1$ rpm–6 (just before enleanment) or $F_{RPM}$–6, which may be a running average or filtered speed, which may also be on a FIFO basis like $F_{RPM}$–80, of the most recent 6 or other desired number of engine revolutions to determine whether within 75 consecutive engine revolutions $F_{RPM}$–6 becomes approximately equal to $F_{RPM}$–80. In the example of FIG. 13, this occurs when the $F_{RPM}$–6 line intersects or meets the $F_{RPM}$–80 line, which is shown to occur at about revolution 27,585. If not, the remainder of the process is aborted and it returns to the beginning of step 454. If step 468 determines the engine speed has recovered within 75 revolutions, the process may then proceed to step 470 which determines and stores the difference (Δrpm) between the engine speed near or at the end of the enleanment ($F_2$ rpm–6) and the engine speed just before starting the enleanment ($F_1$ rpm–6). Desirably, but not necessarily, this Δrpm is stored for at least a few repetitions of the steps of 454 through 468, to provide several Δrpm values (Δrpm 1-n) such as, for example, 1-5 values. The Δrpm 1-n values may be all substantially the same, or some positive and some negative and not substantially the same. After obtaining and storing 1-n Δrpm values, the process may advance to step 472 which determines whether there is any significant change in any of the n values of Δrpm such as in 5 values. If all 5 values fall within a predetermined range of speed change, such a –85 rpm to +100 rpm, step 472 considers this to be no substantial change and advances to step 474 which actuates the solenoid 8 to make a relatively small enleanment change in the air/fuel ratio such as not more than 1% and desirably 0.25% or a quarter of one percent and at step 476 the microcontroller changes the solenoid open time to do so.

If step 472 determines that any of the Δrpm 1-n values were a substantial change in engine speed (outside of the –85 to +100 rpm threshold), the process advances to step 478 which determines whether some fraction or portion of the speed changes such as three out of five were either positive Δrpm or negative Δrpm and outside of the predetermined range within 25 engine revolutions of the beginning of the enleanment step 464 and if so, advances to step 480 which determines a relatively large change of the air/fuel ratio such as 5% should be made for the next series of n Δrpm values and advances to step 476 to control the solenoid to affect this relatively large change of the air/fuel ratio. If step 478 determines that 3 of the 5 Δrpm values were neither positive nor negative and outside of the predetermined range within 25 engine revolutions of the beginning of the enleanment step 464, the process may proceed to step 482, which determines whether at least 3 of these 5 Δrpm values were either positive or negative and outside of the predetermined range within 50 engine revolutions of the beginning of the enleanment step 464, and if so, proceeds to step 484, which determines the solenoid open time for a medium change of the air/fuel ratio such as 2½% and then advances to step 476 to control the solenoid to affect this medium change of the air/fuel ratio. In each of steps 480 and 482 if at least 3 of the 5 Δrpm changes ($F_2$–$F_1$) are positive and outside of the predetermined range, an enrichment of the air-to-fuel ratio of 5% or 2½% respectively, is determined and made, or if at least 3 of the 5 Δrpm changes are negative and outside of the predetermined range, an enleanment of the air-to-fuel ratio of 5% or 2½% respectively, is determined and made. In step 482, if 3 of the 5 Δrpm speed changes are neither positive nor negative or are within the predetermined range, then no change is made in the air-to-fuel ratio and the process returns to the beginning of step 454.

In step 476, after each change of the solenoid closed or open time, the process returns to the beginning of step 454 to develop an updated set of Δrpm 1-n values. Since the enleanment step 464 and recovery step 468 together are carried out in 125 engine revolutions, and in step 460 the counter aborts the process after each 200 engine revolutions, the engine typically will reach a stable operating condition before the beginning of the next set of Δrpm 1-n values is determined and saved in step 470.

As illustrated in FIG. 13, if the engine is operating at an A/F ratio of lambda 0.835 at an $F_1$ rpm–6 speed of about 9,380 rpm just before its A/F ratio at 490 was enleaned 5% or to a lambda of about 0.877 for 50 revolutions, this resulted in an average engine speed for the last 6 revolutions of enleanment ($F_2$ rpm–6) of about 9,305 rpm, and after this enleanment the $F_{RPM}$–6 engine speed recovered at 492 as determined in step 468 in about 30 revolutions, and as determined in step 458 over 250 revolutions the engine speed varied by less than 200 rpm. Thus, the Δrpm [$F_2$ ($F_{RPM}$–6 last)–$F_1$($F_{RPM}$–6 before start)] of –75 rpm is a valid Δrpm, as determined and saved in step 470. The next enleanment at 494, which due to the counter of step 460, starts 200 revolutions after the first enleanment at 490, of the A/F ratio by 5% to a lambda of about 0.835 for 50 revolutions resulted in an average engine speed $F_2$ of the last 6 revolutions of this enleanment of 9,265 rpm. The average engine speed $F_1$ for the 6 revolutions just before the start of this next enleanment is 9,370 rpm. After this second enleanment the engine speed recovered at 496 within 75 revolutions as determined in step 468 and as determined in step

458 the $\Delta R_1$ for this second enleanment was about 220 rpm. Thus the second enleanment produced a valid $\Delta rpm_2$ engine speed change of −105 rpm as determined and stored in step 470.

The process 450 may be repeated many times per minute of engine operation and therefore can provide extremely good control of the desired air/fuel ratio of the operating engine over a wide range of operating speeds. For example, if the engine was running for one full minute at a speed in the range of 9,000-9,200 rpm the process could obtain as many as about 45 sets of valid values for Δrpm 1-5 on which to make any needed adjustments in the A/F ratio of the fuel mixture supplied by the carburetor to the running engine and with the engine operating for one minute at an essentially constant speed in the range of 7,000-7,200 rpm the process could obtain about 35 sets of valid Δrpm 1-5 values on which to make any needed adjustments in the A/F ratio.

The number (x) of engine revolutions in each of steps 456 and 468 is significantly greater than the number of engine revolutions in each of steps 462 and 466, for example, may be at least 6 times greater, and desirably at least 9 times greater. The period of enleanment of step 464 needs to be long enough to potentially provide a significant change in engine speed, and short enough that it does not significantly adversely affect engine performance. For example, in step 464 the period of enleanment may be at least 3 times, and desirably 7 times greater than the number of engine revolutions of step 462 or 466. The recovery period of step 468 may be sufficient for the engine to return to a speed at least substantially equal to its speed just before beginning the enleanment of step 464, for example, at least for the same number of engine revolutions as the period of enleanment, and desirably at least 1.25 times such engine revolutions of enleanment.

For a gasoline powered spark ignited single cylinder 4-stroke engine with a displacement of 15-60 cm³, the step 454 engine speed $R_1$ may be at least 4,500 rpm and desirably at least 5,000 rpm, $\Delta R_1$ of step 458 may be at least 100 rpm for at least 20 revolutions, $F_1$ of step 462 and $F_2$ of step 466 may be for at least 3 revolutions, the enleanment of step 464 may be for at least 10 revolutions, and $F_{RPM}$ of step 456 and the recovery of step 468 may be for at least 20 revolutions.

For a gasoline powered spark ignited single cylinder 2-stroke engine with a displacement of 15-60 cm³, the step 454 engine speed $R_1$ may be at least 4,000 rpm and desirably at least 7,000 rpm, $\Delta R_1$ of step 458 may be at least 100 rpm for at least 20 revolutions, $F_1$ of step 462 and $F_2$ of step 466 may be for at least 3 revolutions, the enleanment of step 464 may be for at least 20 revolutions, and $F_{RPM}$ of step 456 and the recovery of step 468 may be for at least 40 revolutions.

Since the only sensor required for implementation of the process 450 is the speed of the running engine, and this speed is already sensed and determined by the control circuitry 38 to select and provide the desired ignition timing of the operating engine, this process may be implemented without any additional sensors of other engine operating parameters and by the use of processes such as the process 450 implemented by appropriate software executed by the microcontroller and other components of the control circuit 38 to determine and change as needed the A/F ratio for efficient operation of the engine by controlling the open time or the closed time of a solenoid actuated valve controlling the quantity of fuel in the air/fuel mixture supplied by the carburetor to the running engine.

It is also believed possible to utilize the system to provide a richer air/fuel mixture to support engine acceleration. This may be accomplished by altering the ignition timing (e.g. advancing ignition timing) and/or by reducing the duration that the solenoid is energized so that less enleanment, and hence a richer fuel mixture, is provided. When the initial carburetor calibration is rich (e.g. approximately 20-25% rich), no solenoid actuation or less solenoid actuation will result in a richer fuel mixture being delivered to the engine. Further, if the amount of acceleration or acceleration rate can be sensed or determined, a desired enrichment amount could be mapped or determined based on the acceleration rate. Combining both the ignition timing advance and the fuel enrichment during transient conditions, both acceleration and deceleration can be controlled for improved engine performance. Ignition timing may be controlled, in at least some implementations, as disclosed in U.S. Pat. No. 7,000,595, the disclosure of which is incorporated by reference herein, in its entirety.

Idle engine speed can be controlled using ignition spark timing. While not wishing to be held to any particular theory, it is currently believed that using a similar concept, fuel control could be used to improve the idle engine speed control and stability. This could be particularly useful during the end of transient engine conditions such as come-down. The combination of ignition and fuel control during idle could improve engine performance.

Ignition timing control is considered a fast response control method in that the engine speed or other engine parameter may change quickly when the ignition timing is changed. However, the controllable engine speed range is constrained by the maximum and minimum amount of ignition timing advance the engine can tolerate. Air/fuel mixture changes are considered a somewhat slower response control method in that the engine operating changes may be slower than with an ignition timing change. Combining the slower response air fuel mixture control with the faster response ignition control can greatly expand the engine speed control range, and this may be particularly useful, in at least some engines and applications, at engine idle or near idle operating speeds and conditions. Of course, the innovations disclosed herein are not limited to idle and near-idle engine operation.

As noted above, the range of engine speed control that may be achieved by ignition timing control (e.g. advancing or retarding ignition events) is confined to the combustible range of ignition advance. Practical limitations could be even narrower in any given engine application, around 20-30 degrees of ignition advance, to ensure proper engine performance such as acceptable acceleration, roll-out, come-down, etc. While most engines can experience performance benefits from ignition timing based idle engine speed control, it is possible to exceed the ignition control range which can negatively affect engine performance in at least some instances, such as when different fuel is used or the air density changes from altitude and temperature changes. Some of these changes or combinations of changes can effectively exceed the ignition timing idle speed control range resulting in the idle speed exceeding its specified set-point. To expand the effective idle engine speed control window the addition of fuel and air mixture control (i.e. changing the air/fuel ratio of the mixture delivered to the engine) can be combined with ignition timing.

In a combined control system, a desired threshold of ignition timing change may be established, and a desired engine idle speed threshold, likely set as a range of speed, may also be established. Idle engine speed outside of the engine idle speed threshold may first result in a change of the engine ignition timing. The ignition timing may be altered up to the ignition timing change threshold, and if the engine speed ends up within the engine idle speed threshold by only the change in ignition timing, nothing more needs to be done. Subsequent engine speed changes may be handled in the same manner. If, however, the ignition timing is altered up to the threshold ignition timing change and the engine speed is still outside of the engine speed threshold, then the fuel and air mixture ratio may be altered until the engine speed is within the threshold. This combination of ignition timing control and air/fuel mixture control can greatly expand the ability to control engine idle speed for all environmental conditions. Further, utilizing the faster response ignition timing control as the first measure to control engine idle speed enables more rapid engine speed control in many instances, and only when that is insufficient is the slower response fuel/air adjustment control implemented. This enables more rapid and responsive engine speed control.

Increases in spark advance (where the spark is the start of an ignition event) generally result in increases in engine speed and decreases in spark advance generally result in engine speed decreasing. Likewise since most small engine carburetors are initially set with a slightly rich air/fuel mixture (and slightly open throttle valve setting), increasing the air/fuel mixture ratio (which makes the air/fuel mixture leaner, for example from 9:1 to 11:1) will result in an engine idle speed increase and decreasing the air/fuel mixture (which makes the air/fuel mixture richer, for example from 13:1 to 10:1) will generally result in an engine speed decrease.

In a representative system, the ignition timing control threshold may be set at plus or minus four (4) degrees of the normal ignition timing, where the degrees indicate the angular engine position relative to TDC or some other reference position at which the ignition spark is provided. Once the ignition control threshold is exceeded on the high side (e.g. at +4°) the fuel mixture can then be leaned out to increase the engine speed while maintaining the ignition timing within the threshold, or even allowing a reduction in the magnitude of the ignition timing change from the nominal/normal ignition timing. Likewise, if the ignition timing advance is reduced below the low threshold (e.g. −4°) the air/fuel mixture can be richened to reduce the engine speed while maintaining the ignition timing within the threshold, or even allowing a reduction in the magnitude of the ignition timing change from the normal ignition timing.

Figure 9:
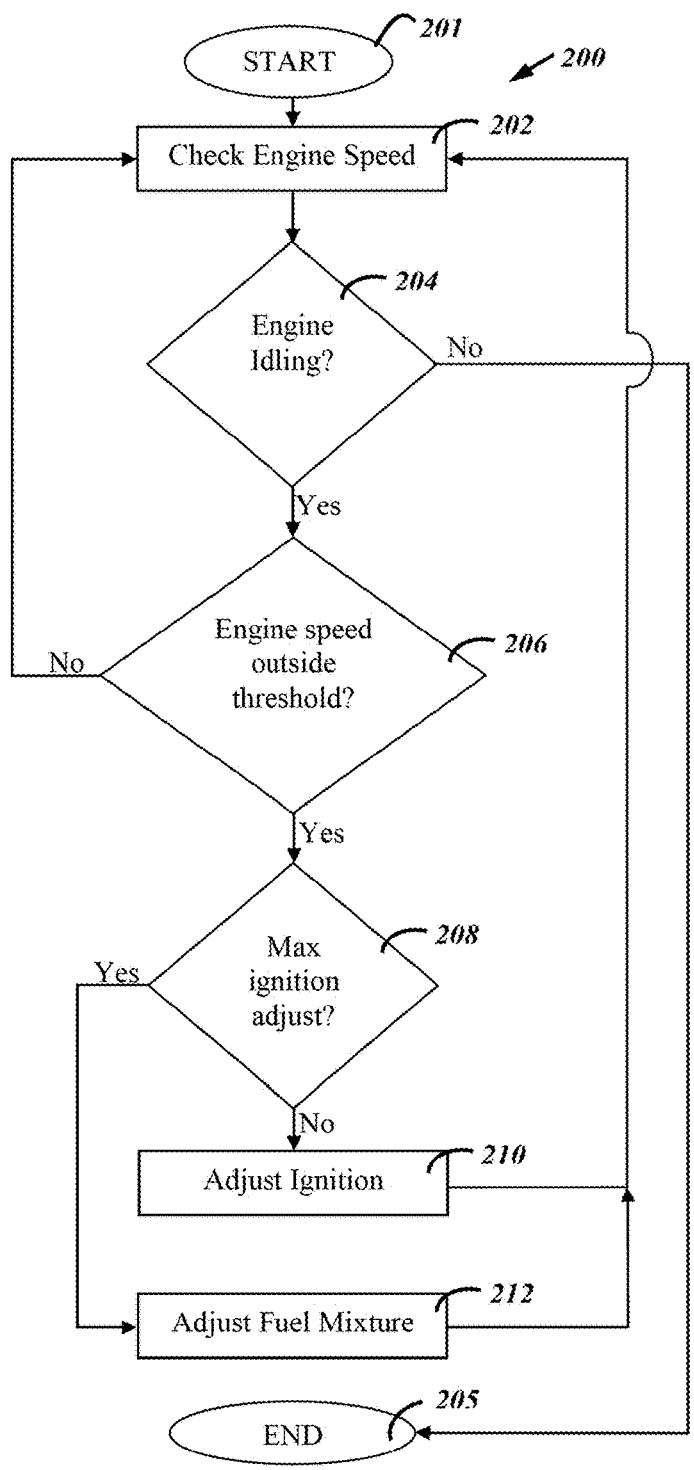
FIG. 9 is a flow chart of an example of an engine idle operation control process.

One representative control process 200 is generally shown in FIG. 9. The process starts at 201, the engine speed is checked at 202 and a determination is made at 204 as to whether the engine is idling or near enough to idle for the process. In this example, the process is used only for engine idle and near idle operation and other strategies may be used when the engine is not at or near idle, if desired. If the engine operation does not satisfy the first condition then the process may end at 205. If the engine operation satisfies the first condition, then it is determined in 206 whether the engine speed is within a desired range for idle or near idle operation. If the engine speed is within the threshold, then the process may be started over, to again check engine idle operation as desired. This check may be run at any desired periodic timing.

If the engine speed is outside of the threshold, then it is determined at 208 whether the maximum ignition timing adjustment has already been made (i.e. if the ignition timing is within a threshold range). If the ignition timing is within its threshold, then the ignition timing may be adjusted at 210 up to its threshold in one or more iterative steps or otherwise, as desired. If additional ignition timing is not available within that threshold, then the process continues to 212 where the air/fuel mixture may be adjusted to provide a desired engine speed change. The process may continue to check engine speed periodically (such as every revolution or at longer intervals) or the process may end. The process may be run again, as desired, to monitor and change as needed the engine idle speed operation.

Additional control calibration techniques can be applied to further refine the idle speed stability and accuracy. Things like looking statistically at the number of revolutions or time the ignition timing has exceeded the threshold or the standard deviation of the ignition timing value exceeding the threshold value can further refine the strategy. Among other things, the normal ignition timing may be altered, and or the ignition timing control threshold adjusted, depending upon actual engine operating data.

By knowing which phase the engine is operating on the total electrical power consumption used by the engine can be greatly reduced when only consuming electrical power every other revolution. This is particularly beneficial at low engine speeds when the power generation capacity of the ignition module is often less than the required power to control the engine every revolution (ignition timing and secondary electrical loads such as an electronic carburetor).

Four stroke engines have four distinct cycles; intake, compression, power and exhaust. These four cycles take place over two engine revolutions. Beginning at TDC the intake cycle begins and at the subsequent BDC the intake cycle ends and the compression stroke begins. At the next TDC the compression cycle is completed and the power stroke begins. At the next BDC, the power cycle is completed and the exhaust stroke begins. Hence, the intake and compression cycles occur in one engine revolution and the power and exhaust cycles occur in the next engine revolution. The time for the engine revolution including the intake and compression cycles is greater (slower engine speed) than the time for the engine revolution power and exhaust cycles (faster engine speed). This is largely due to losses from intake pumping and compression resulting in the engine speed decreasing during the intake and compression engine revolution. Conversely during the power or combustion cycle the engine speeds up due to the increase in pressure developed during a combustion event.

The difference in speed is detectable with the use of a microprocessor clock such as is found in digital ignition modules. Measuring the time for an engine revolution may be performed on small engines that have a single magnet group mounted on/in the flywheel. As the flywheel magnet rotates past the ignition module an electrical signal is produced that can be used as a crankshaft angle measurement. Every engine revolution produces one electrical signal therefore the time between these signals represents the average engine speed for a single revolution. Further refinement of this concept can be done with multiple magnet groups thereby allowing detection of the individual engine cycles rather than the just the engine revolution that produces power. This also will result in greater crankshaft angular resolution (ability to determine crankshaft position) within a single engine revolution.

Since there can be a large amount of cyclic variation from revolution to revolution, it sometimes can be difficult to guarantee the determination of the engine revolutions (e.g. the revolution that corresponds to the intake and compression cycles, or the revolution that corresponds to the power and exhaust cycles).

To improve the accuracy of phase detection, a process that determines engine speed for a number of engine revolutions may be used. An example of such a process is described below. At engine startup, an ignition spark is provided every engine revolution, as is common, and a threshold number of engine revolution speeds or time is recorded. In one example, the time for each of 20 engine revolutions is recorded, and this data may be recorded in any suitable manner on any suitable device, such as but not limited to a First-In-First-Out (FIFO) buffer. In this way, the last or most recent 20 engine revolution times/speeds are stored. Of course, the data for more or fewer engine revolutions may be used and 20 is just one example.

After a threshold number of engine revolutions, for example chosen to permit the engine speed to stabilize, the recorded engine revolution data is checked to see if an alternating pattern has occurred, for example where every other revolution is longer than the intervening revolutions. The second threshold may be any desired number of engine revolutions, or it may simply be a time from engine start or other engine event. In one example, the second threshold is 12 revolutions although other numbers of revolutions can be utilized as desired.

The process may look at any number of engine revolution times/speeds to determine if a desired pattern has occurred. For example, the process may look at all 20 recorded engine revolution times to determine if the desired timing pattern has occurred. And the process may continue until 20 consecutive engine revolutions show a desired timing pattern, e.g. every other revolution being shorter or longer than the intervening revolutions. This analysis may be conducted for a given number of engine revolutions after engine starting, or some other chosen engine event. For example, in one form, this analysis of the last 20 revolutions occurs for only the first 50 engine revolutions after engine starting. This relatively short window may be chosen to reduce the likelihood that the engine operation will change (for example, due to throttle valve actuation) which would cause an engine speed change not due to the various engine cycle effects.

Figure 10:
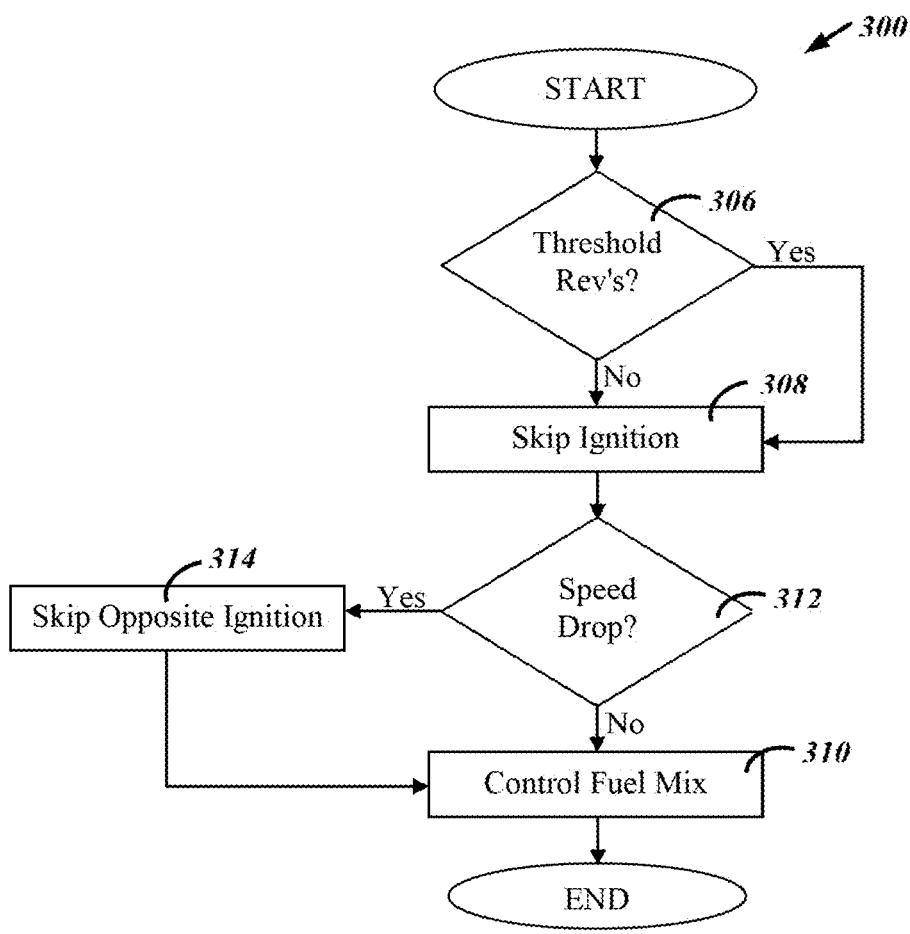
FIG. 10 is a flow chart of an example of an engine ignition and/or fuel control process.

A general description of the process 300 is shown in FIG. 10. At 306 it is determined if the desired number of consecutive (or perhaps a threshold percentage of) engine cycles indicates a desired pattern of engine speed changes within a desired window of engine revolutions, then the process may continue to 308 wherein an ignition event is skipped every other revolution. In one form, the ignition event is provided only during the engine revolution including the power cycle and an ignition spark is not provided during the engine revolution including the intake and compression cycles. This avoids wasting an ignition spark and the energy associated therewith. Also, fuel may be provided from the carburetor or other fuel supplying device only during the correct engine revolution or cycle, e.g. the engine revolution including the intake and compression cycles, which is noted at 310. In this way, more efficient engine operation can be achieved to conserve electrical energy, conserve fuel and reduce engine emissions.

When ignition events are skipped, a check of the engine speed can be performed at 312 to ensure that the engine speed is not adversely affected, which could mean that the incorrect spark is being skipped. For example, if after a couple of skipped ignition events the engine speed decreases beyond a threshold, this could mean that the ignition spark needed for combustion was skipped. If an engine speed decrease is detected, the ignition spark may be provided every engine revolution at 314, or the skipped spark may be changed to the other engine revolution and a check of the engine speed performed to see if the ignition spark is being provided during the correct engine revolution.

The engine speed check may occur as the revolutions are recorded, or the check may look to previously recorded data for engine revolutions. In the example below, the most recent engine revolution recorded is rpm[0], the previous revolution is rpm[−1], the revolution before that is rpm[−2], etc. For the engine cycle/revolution detection to be considered successful, then the recorded revolution data needs to satisfy: (rpm[0]>rpm[−1]) AND (rpm[−1]<rpm[−2]). If satisfied, then the review continues to (rpm[−2]>rpm[−3]) AND (rpm[−3]<rpm[−4]). And so on until a threshold number of revolutions satisfy the pattern, where the threshold number of revolutions needed can be any number up to and including all of the revolutions stored on the buffer. When the threshold number of revolutions satisfies the pattern, the system moves to the next phase which is to skip ignition events and provide fuel in accordance with the determined engine revolutions and the engine cycles occurring during these revolutions.

If the desired number of consecutive engine revolutions does not indicate a desired pattern of engine speed changes within a desired window of engine revolutions (a "no" response at 306), then the ignition event may be terminated or not provided every other engine revolution for a determined number of engine revolutions. While in FIG. 10 the "skip ignition" step is shown as 308 in either determination from 306, where the threshold revolution criteria is satisfied at 306, the "skip ignition" occurs based on this data, and when the criteria is not satisfied, the skip ignition occurs based on something else. When to skip the spark may be chosen based upon an analysis of the recorded revolutions (e.g. if more revolutions are slower than the others, on an every other revolution basis, then this information may be used for the initial spark skip even though the full threshold of revolutions did not satisfy the set rule) or the next scheduled or any subsequent spark may be skipped without regard to the recorded data. In one example, an ignition event is skipped every other engine revolution for four engine revolutions. If the engine speed does not decrease beyond a threshold after the skipped ignition events (as determined at 312), then the system considers that the ignition events were skipped during the correct engine revolutions. Subsequent ignition events may also be skipped during corresponding engine revolutions, and the fuel supply may also be controlled based on this timing. If, however, the engine speed does decrease beyond a threshold after the skipped ignition events, then the ignition events were skipped during the incorrect engine revolutions. Subsequent skipped ignition events can then be set to the other engine revolutions and the fuel supply to the engine may also be controlled based on this timing. Subsequent checking of engine speed may also be used to ensure the skipped ignition events are not adversely affecting engine speed.

Additionally statistical analysis of the alternating pattern can be performed to provide an accurate determination of engine cycle/phase when there are larger amounts of cyclic variation or small differences in cyclic engine speed. This type of analysis can be done to effectively reduce the determination time required.

In general, most small engines idle run quality is best when the ignition timing is slightly retarded and the air/fuel mixture is near optimum. But during these conditions most small engines will also experience performance problems during fast transient accelerations and decelerations. To help alleviate this issue, both rapidly advancing the ignition timing and enriching the fuel mixture for several revolutions can improve engine performance. The difficulty in doing so on small low cost engines stems from not having sensors to indicate that a rapid load change is starting to occur, such as a throttle position sensor or a manifold pressure sensor.

This disclosure describes how using the raw ignition signal along with controlling ignition timing and fuel mixture on a cyclic basis can improve engine performance during these fast transient conditions. Controlling ignition timing based on transient changes in the ignition signal has been described in U.S. Pat. No. 7,198,028. Use of these detection methods can now be applied to rapidly change the ignition timing and also rapidly change the fuel mixture via an electronic fuel control actuator in the carburetor, thereby improving the acceleration and deceleration qualities of the engine.

One example of a fuel control actuator includes a solenoid that blocks at least a portion of the fuel flow during the engine intake cycle. As an example, if the blocking action normally occurs at the end of the intake cycle, the fuel mixture can be leaned-out by activating a normally open solenoid at an earlier crank angle position, in other words by blocking at least some fuel flow for a longer duration of the intake cycle. Many possible calibration configurations exist but an example might be activating the solenoid at 200° ATDC results in a Lambda value of 0.78 (rich) and a solenoid activation angle of 145° ATDC results in a Lambda value of 0.87 (9% leaner). Therefore, changing the solenoid activation angle to a richer Lambda setting (less fuel flow blocking) during transient accelerations can improve the engine response and performance. This enriching of the mixture during acceleration can be tailored up to a full rich setting (no solenoid activation, so no fuel flow blocking) and also controlled for any number of engine revolutions after the detection of a transient change has occurred. Additionally, the fuel flow control can be optimized in any number of ways, for example, running full rich (no fuel flow blocking) for a certain number of revolutions and decreasing the richness of the fuel mixture (i.e. increasing the fuel flow blocking) at a set rate for a certain number of additional revolutions. In just one of nearly limitless examples, no fuel flow blocking may be provided for 3 revolutions and the richness may be decreased (i.e. increased fuel flow blocking) for 10 revolutions. Many additional options for the actual control calibration exist. Likewise control of the deceleration performance can be improved through similar control techniques, and in at least some implementations, the richness of the fuel mixture can be increased (i.e. decreasing the fuel blocking) during the deceleration event. During acceleration, the ignition timing may also be advanced up to its maximum advancement, which may be a predetermined and/or calibrated value relative to a nominal or normal ignition timing for a given engine operating condition. During deceleration or come-down periods, the ignition timing may be retarded for a desired time (such as, but not limited to, a certain number of revolutions). When to alter/retard/advance the ignition timing and by how much to alter the timing may be predetermined or calibrated values. In this way, the ignition timing and fuel control may be adjusted together or in series during acceleration and deceleration of the engine.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of controlling a fuel-to-air ratio of a fuel and air mixture supplied to an operating engine, comprising the steps of:
   (a) determining a first engine speed before enleaning the fuel and air mixture supplied to the engine for a first number of engine revolutions;
   (b) enleaning the fuel-to-air ratio of the mixture for a second number of engine revolutions greater than the first number of engine revolutions;
   (c) determining a second engine speed for a third number of engine revolutions near or at the end of the second number of engine revolutions;
   (d) after ending the enleaning, determining whether the engine speed recovers within a predetermined fourth number of engine revolutions greater than the third number of engine revolutions and, if so, determining a delta speed difference between the first engine speed and the second engine speed; and
   (e) if the delta speed difference is a positive value enriching the fuel-to-air ratio of the mixture supplied to the engine or if the delta speed difference is a negative value enleaning the fuel-to-air ratio of the mixture supplied to the engine.

2. The method of claim 1, further comprising repeating steps (a) through (d) to obtain a plurality of delta speed differences and if at least one half of the plurality of delta speed differences are a positive value enriching the fuel-to-air ratio supplied to the engine or if a negative value enleaning the fuel-to-air ratio of the mixture supplied to the engine.

3. The method of claim 2, wherein the plurality of delta speed differences is at least five speed differences.

4. The method of claim 1, which also comprises determining whether the engine is operating at a speed of at least 4,000 rpm during each of steps (a) through (d) and if not, not using the delta speed difference in step (e).

5. The method of claim 1, which also comprises determining whether the engine is operating at a speed of at least 5,000 rpm during each of steps (a) through (d) and if not, not using the delta speed difference in step (e).

6. The method of claim 1, which also comprises before step (a), determining whether any change in engine speed over at least 20 revolutions is less than 250 rpm and only if so, proceeding to step (a) of determining a first engine speed.

7. The method of claim 1, which also comprises before step (a), determining whether any change in engine speed over at least 20 revolutions is less than 100 rpm and only if so, proceeding to step (a) of determining a first engine speed.

8. The method of claim 1, wherein the first number of engine revolutions is at least 3 revolutions.

9. The method of claim 1, wherein the first number of engine revolutions is at least 6 revolutions.

10. The method of claim 1, wherein the third number of engine revolutions is at least 3 revolutions.

11. The method of claim 1, wherein the third number of engine revolutions is at least 6 revolutions.

12. The method of claim 1, wherein the first number of engine revolutions is the same as the third number of engine revolutions.

13. The method of claim 1, wherein the second number of engine revolutions is at least 10 revolutions.

14. The method of claim 1, wherein the second number of engine revolutions is at least 20 revolutions.

15. The method of claim 1, wherein the second number of engine revolutions is at least 50 revolutions.

16. The method of claim 1, wherein the fourth number of engine revolutions is at least 20 revolutions.

17. The method of claim 1, wherein the fourth number of engine revolutions is at least 40 revolutions.

18. The method of claim 1, wherein the fourth number of engine revolutions is at least 75 revolutions.

19. The method of claim 1, which also comprises determining whether steps (a) through (d) of claim 1 have been completed within a predetermined fifth number of engine revolutions and if not, not using in step (e) any delta speed difference not determined within such fifth predetermined number of engine revolutions.

20. The method of claim 19, wherein the fifth number of engine revolutions is at least 200 engine revolutions.

21. The method of claim 1, further comprising repeating steps (a) through (d) to obtain a plurality of delta speed differences and if all of such plurality of delta speed differences are within a predetermined range then enleaning the fuel-to-air ratio of the fuel mixture supplied to the engine a small amount of not more than 1% of the fuel-to-air ratio of step (a) before the enleaning of the fuel-to-air ratio.

22. The method of claim 21, wherein the predetermined range of such plurality of delta speed differences is in the range of −85 rpm to +100 rpm.

23. The method of claim 1, further comprising repeating steps (a) through (d) to obtain a plurality of delta speed differences and, if within 25 engine revolutions, more than half of such plurality of delta speed differences are outside of a predetermined speed range and positive values, enriching the fuel-to-air ratio supplied to the engine or if outside of the predetermined speed range and negative values enleaning the fuel-to-air ratio of the mixture supplied to the engine by a relatively large change of more than 2.5% but not more than 5% of the fuel-to-air ratio of the mixture supplied to the engine before enleaning the fuel-to-air ratio of the mixture supplied to the engine.

24. The method of claim 23, wherein for such plurality of delta speed differences such predetermined speed range is −85 rpm to +100 rpm.

25. The method of claim 1, further comprising repeating steps (a) through (d) to obtain a plurality of delta speed differences, and if, within 50 engine revolutions and more than 25 engine revolutions, more than half of such plurality of delta speed differences are outside a predetermined speed range and positive values or outside of the predetermined speed range and negative values, a relatively medium change of the fuel-to-air ratio of the fuel mixture supplied to the engine is made of not more than 2½% of the fuel-to-air ratio of the fuel mixture supplied to the engine before enleaning the fuel-to-air ratio of the mixture supplied to the engine.

26. The method of claim 25, wherein the predetermined range for such plurality of delta speed differences is −85 rpm to +100 rpm.

27. The method of claim 26, wherein if more than half of such plurality of delta speed differences are positive values the fuel-to-air ratio of the mixture supplied to the engine is enriched or if more than half of such plurality of delta speed differences are negative values the fuel-to-air ratio of the mixture supplied to the engine is enleaned.

28. The method of claim 1, wherein the fourth number of engine revolutions is at least six times greater than the third number of engine revolutions.

29. The method of claim 1, wherein the second number of engine revolutions is at least three times greater than the first number of engine revolutions.

30. The method of claim 1, wherein the fourth number of engine revolutions is at least equal to the second number of engine revolutions.

31. The method of claim 1 implemented by a microcontroller having an input of the speed of the engine and an output controlling a valve capable of changing the fuel-to-air ratio of the fuel and air mixture supplied to an operating engine.

32. The method of claim 23 wherein the 25 revolutions are within the second number of engine revolutions.

33. The method of claim 1 wherein determining whether the engine speed recovers within a predetermined recovery range of the first engine speed is done by determining when a filtered or average engine speed for one or more revolutions after step (b) is equal to an average engine speed taken over a sixth number of engine revolutions.

34. The method of claim 33 wherein the sixth number of engine revolutions is greater than the fourth number of engine revolutions.

35. The method of claim 33 wherein the sixth number of engine revolutions is greater than the second number of engine revolutions.

36. The method of claim 25 wherein the 50 revolutions are within the second number of engine revolutions.

* * * * *